Oct. 14, 1930.   W. J. PASINSKI   1,778,506
ACCOUNTING MACHINE
Filed July 19, 1926    14 Sheets-Sheet 1

Oct. 14, 1930.   W. J. PASINSKI   1,778,506
ACCOUNTING MACHINE
Filed July 19, 1926   14 Sheets-Sheet 2

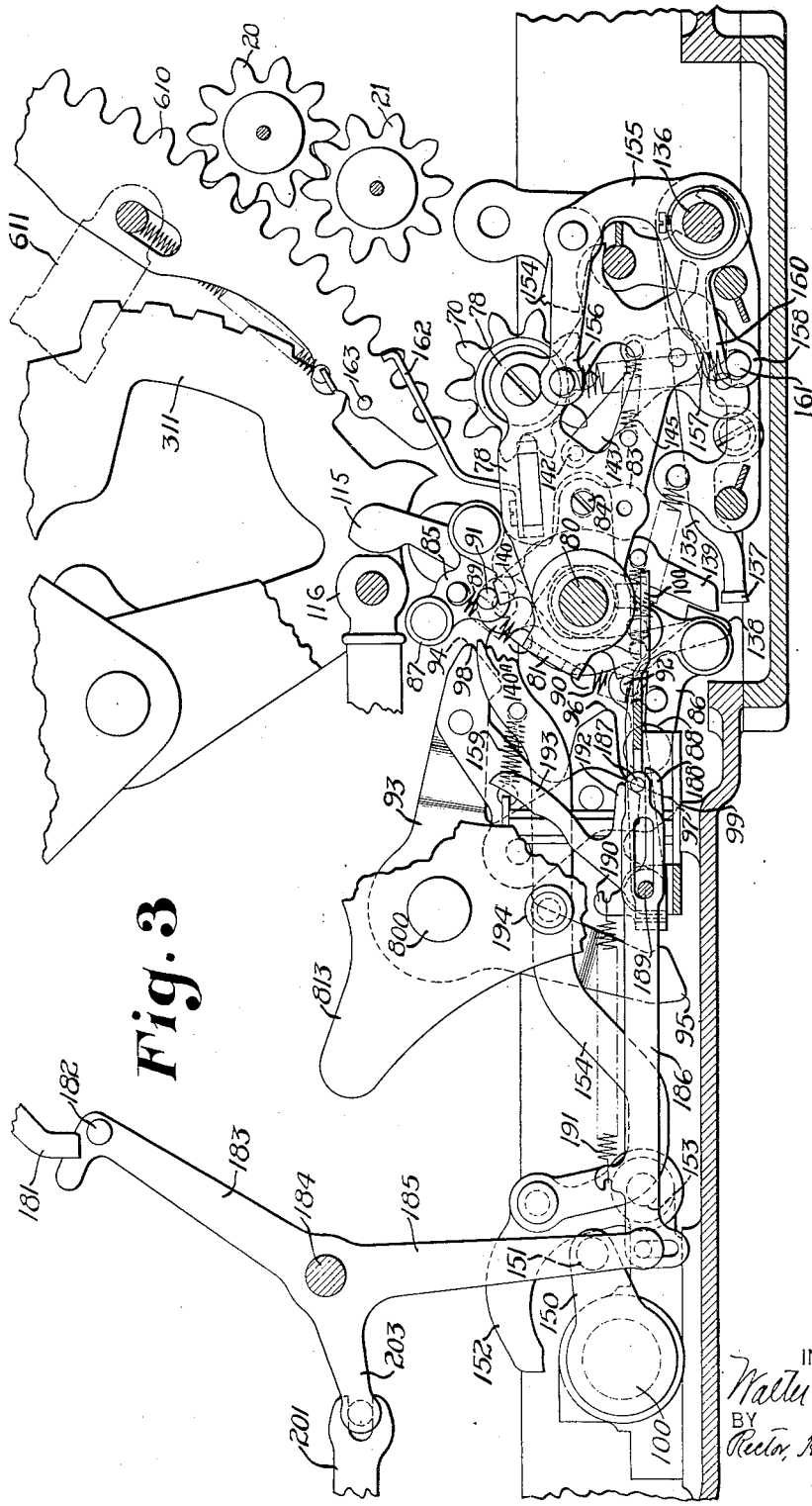

Oct. 14, 1930.  W. J. PASINSKI  1,778,506
ACCOUNTING MACHINE
Filed July 19, 1926   14 Sheets-Sheet 4
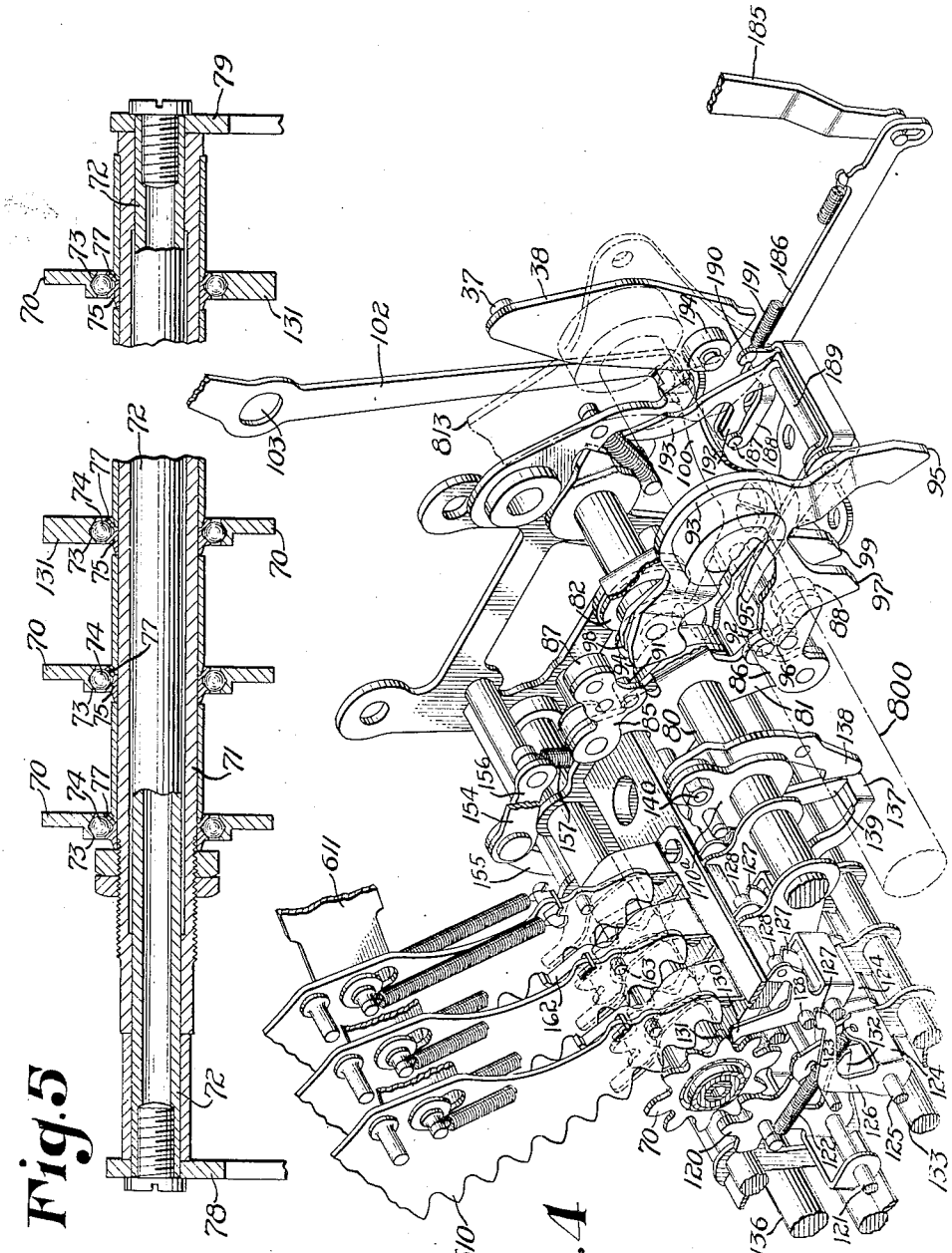

Oct. 14, 1930.  W. J. PASINSKI  1,778,506
ACCOUNTING MACHINE
Filed July 19, 1926  14 Sheets-Sheet 5
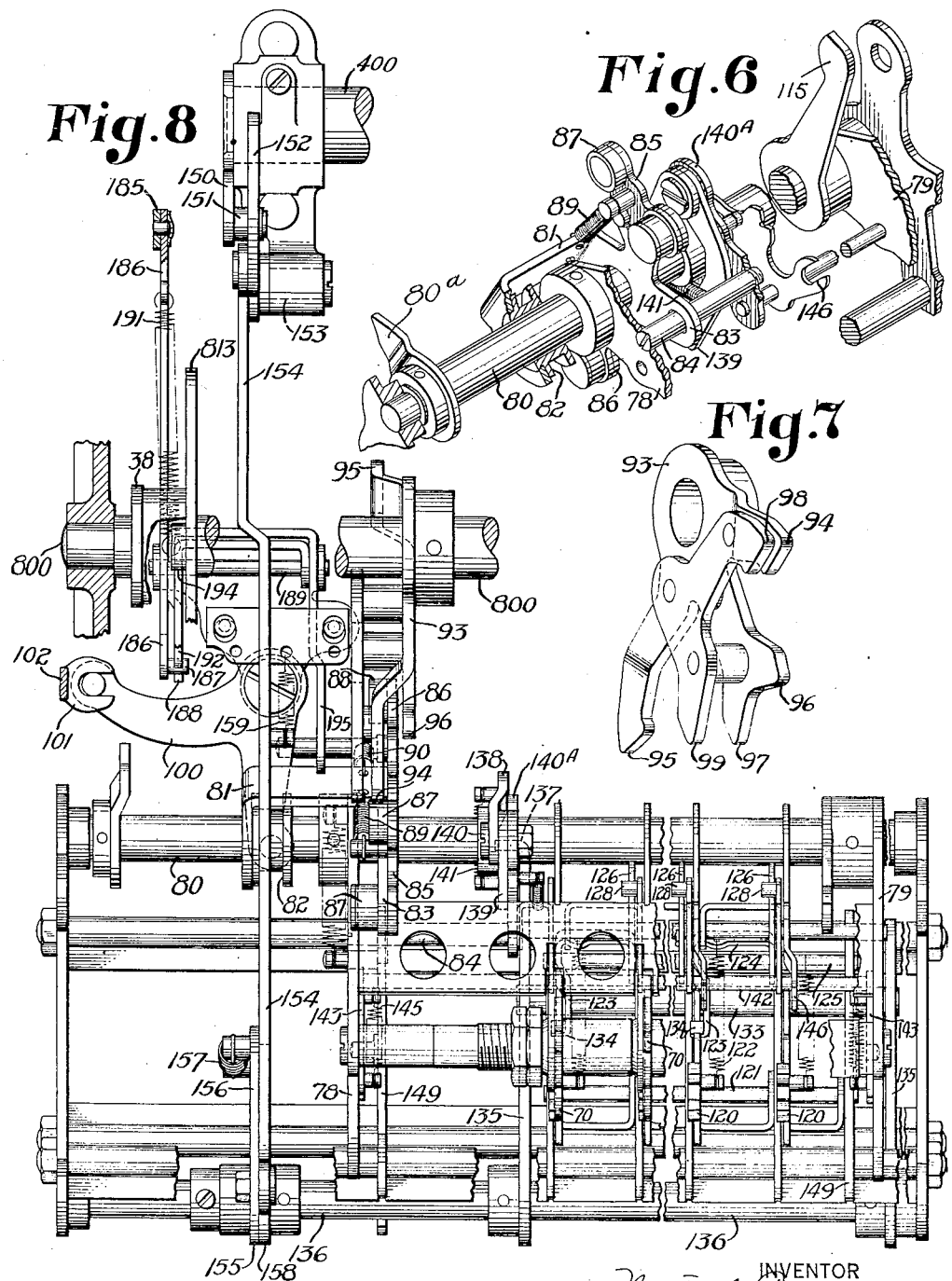

Oct. 14, 1930.  W. J. PASINSKI  1,778,506
ACCOUNTING MACHINE
Filed July 19, 1926   14 Sheets-Sheet 6

Oct. 14, 1930.  W. J. PASINSKI  1,778,506
ACCOUNTING MACHINE
Filed July 19, 1926   14 Sheets-Sheet 7
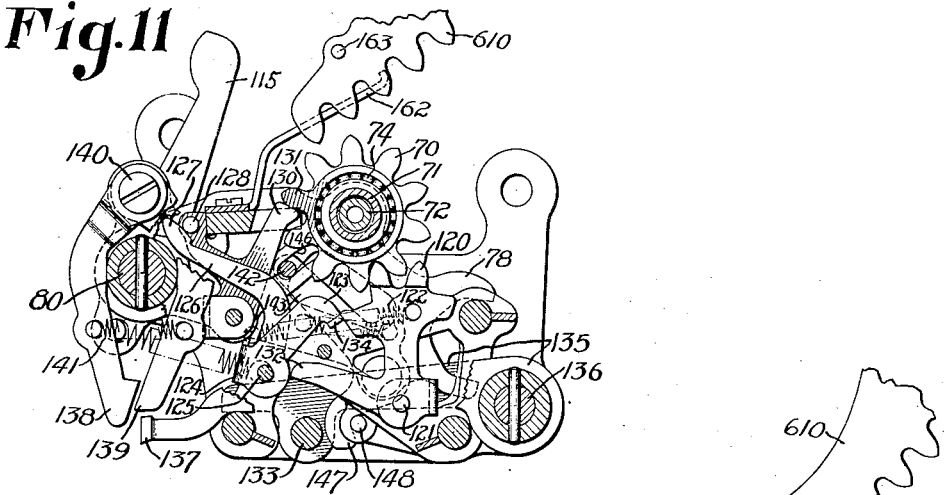

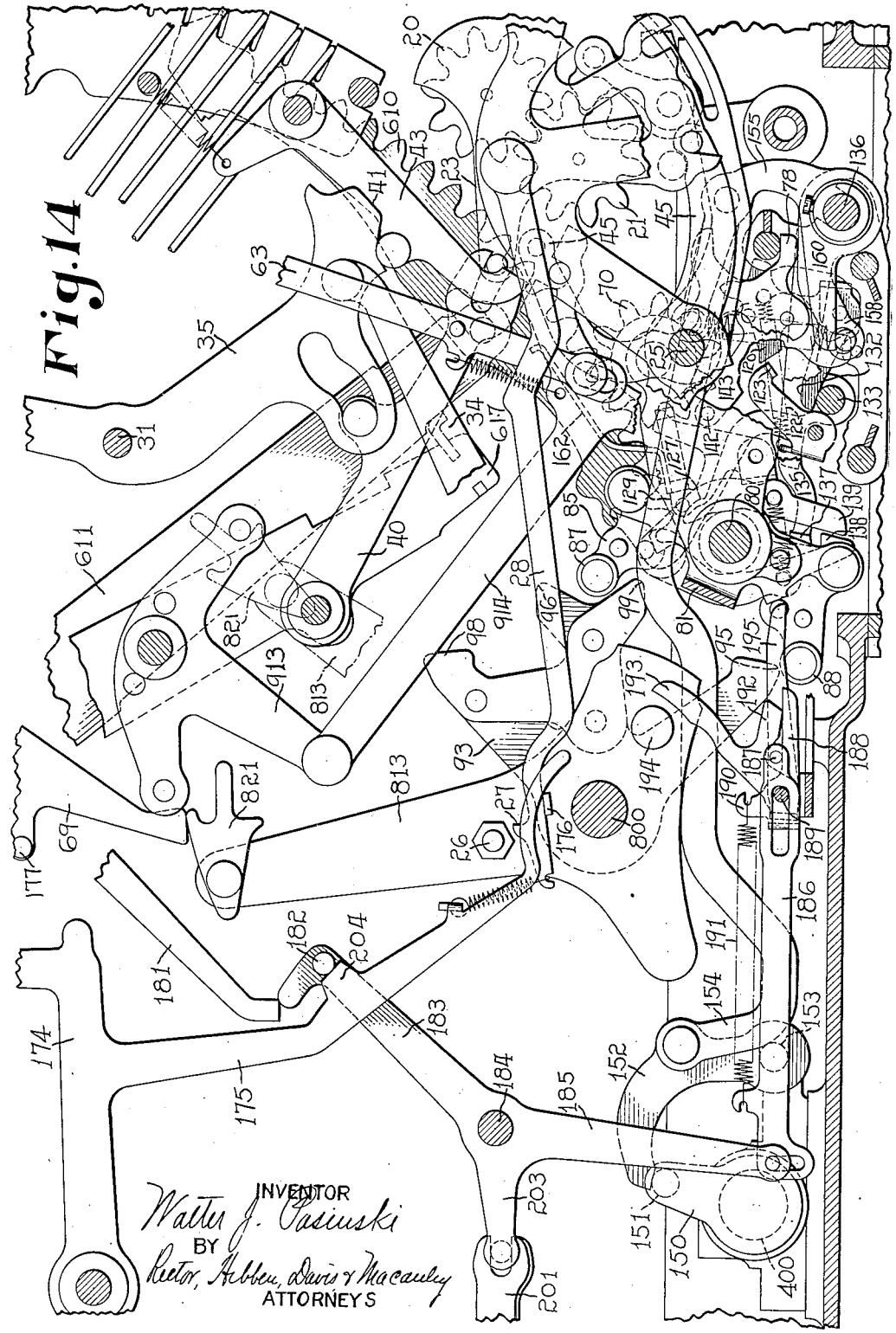

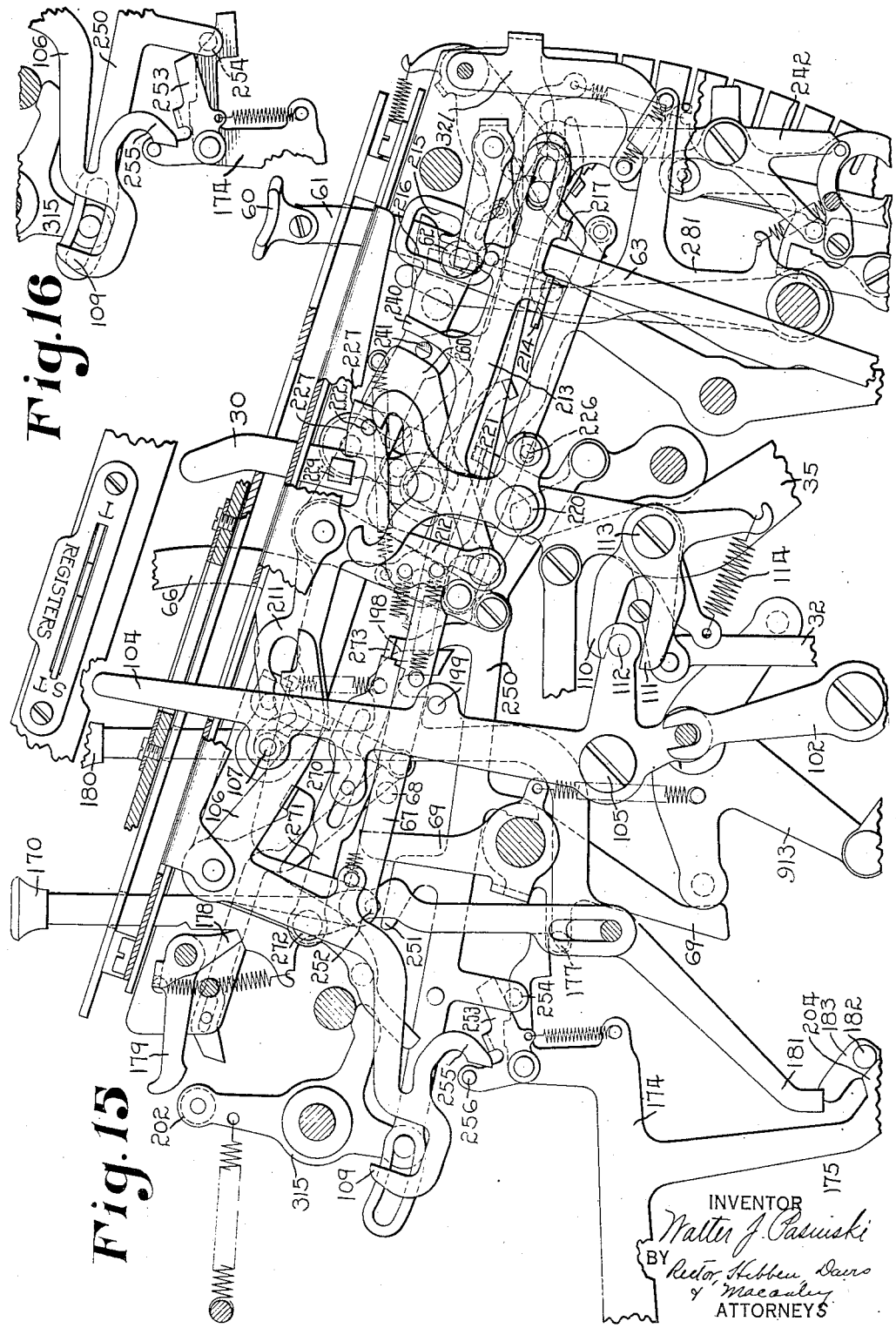

Oct. 14, 1930.                W. J. PASINSKI                1,778,506
                            ACCOUNTING MACHINE
                            Filed July 19, 1926        14 Sheets-Sheet 10
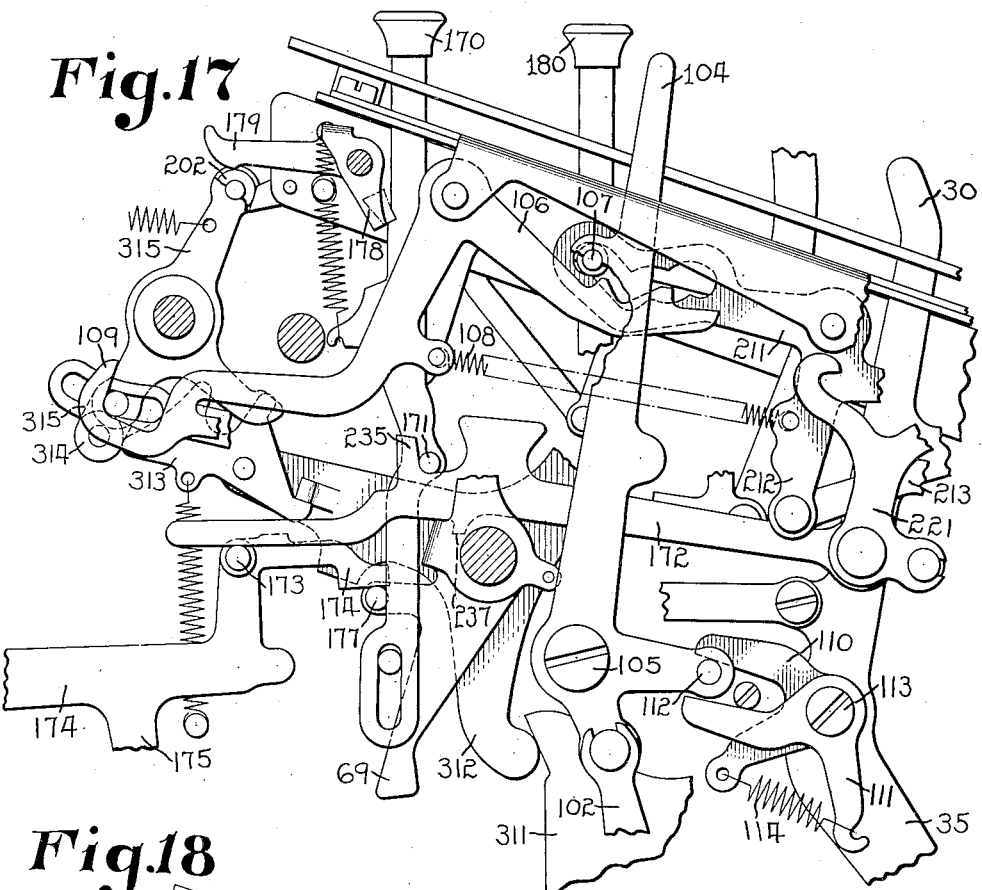
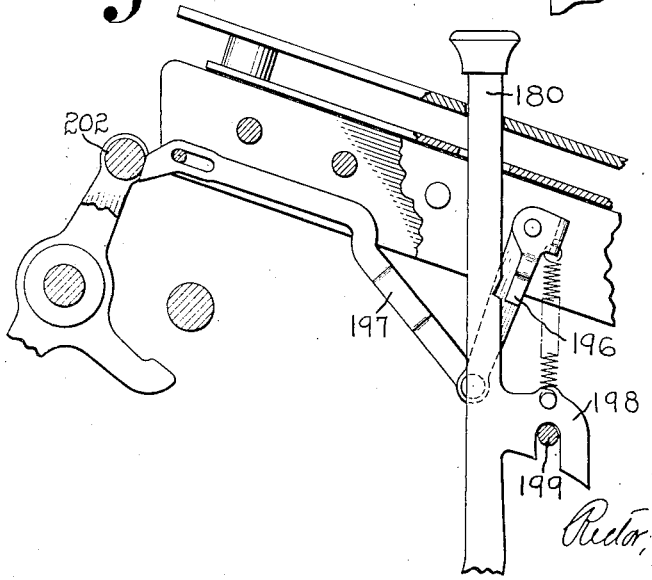
INVENTOR
Walter J. Pasinski
BY
Rector, Hibben, Davis, & Macauley
ATTORNEYS

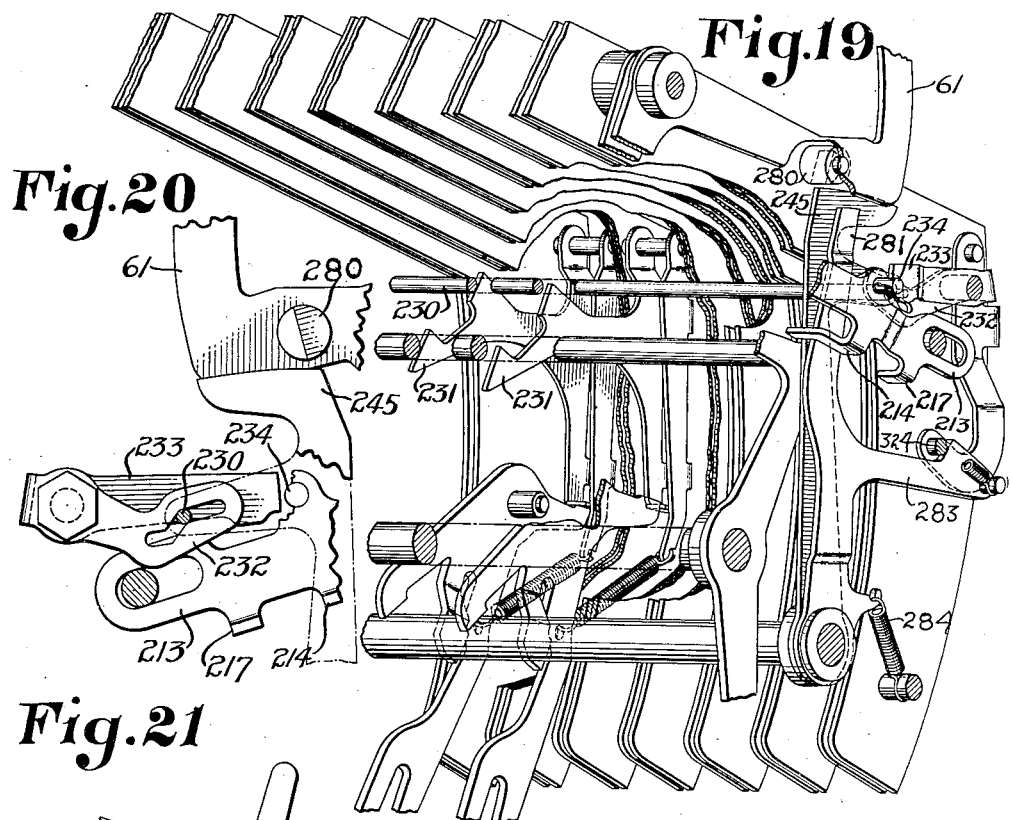

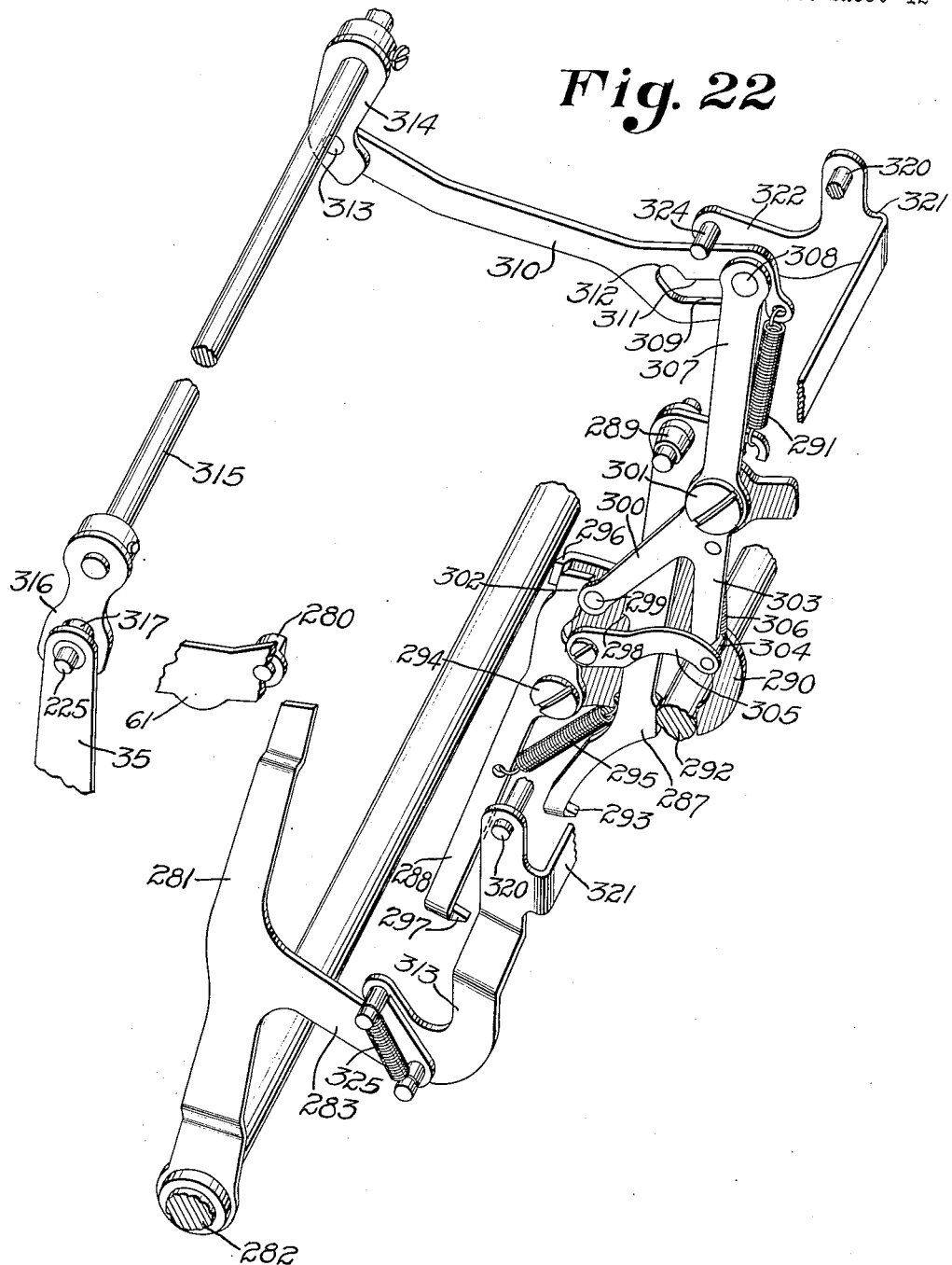

Oct. 14, 1930.   W. J. PASINSKI   1,778,506
ACCOUNTING MACHINE
Filed July 19, 1926   14 Sheets-Sheet 13
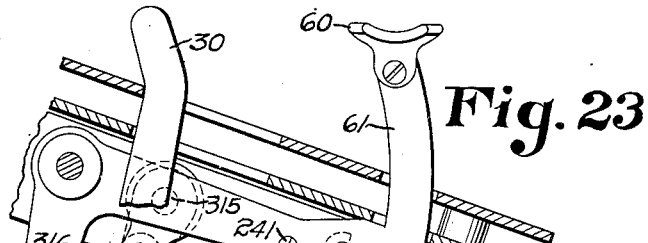
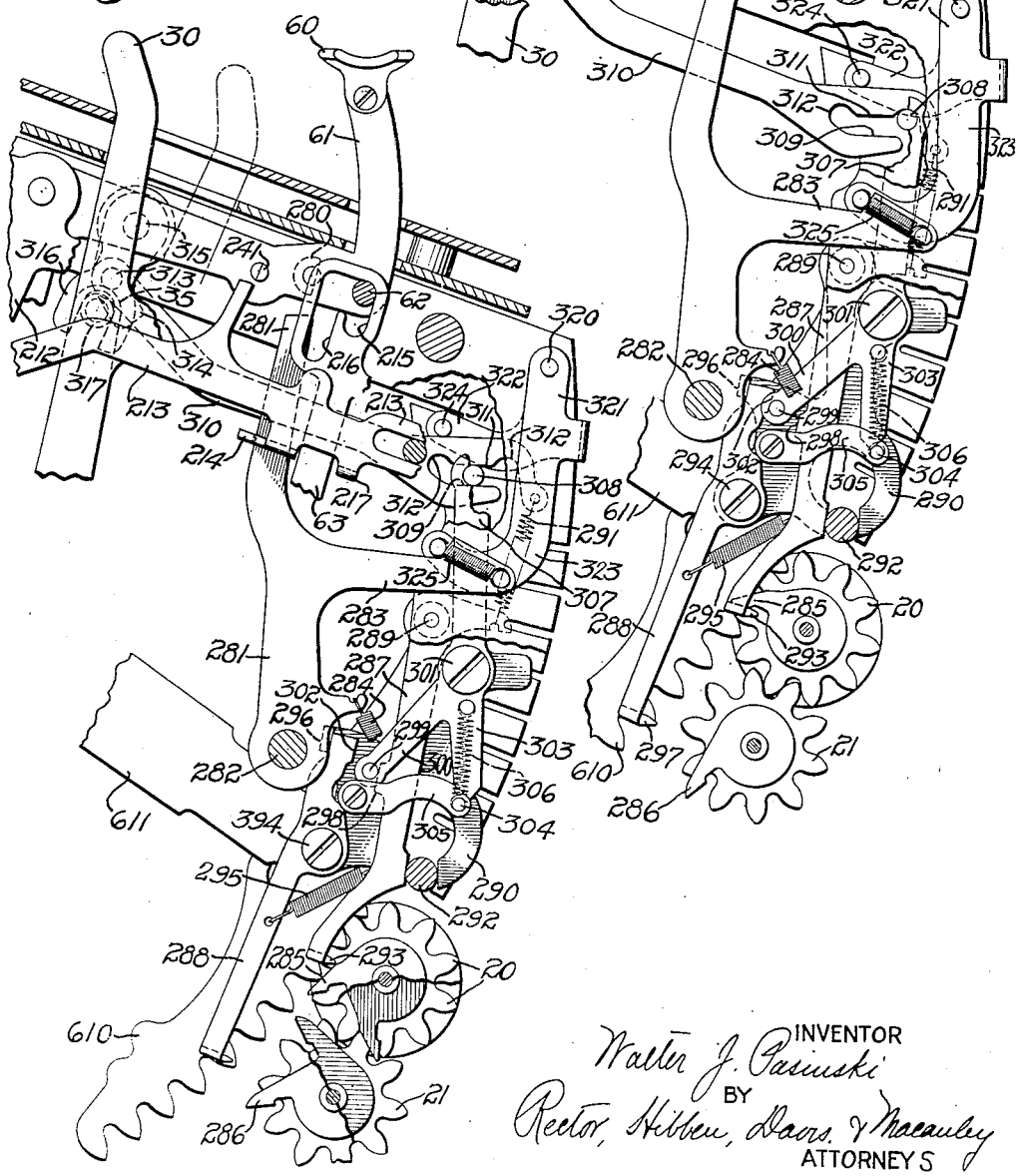

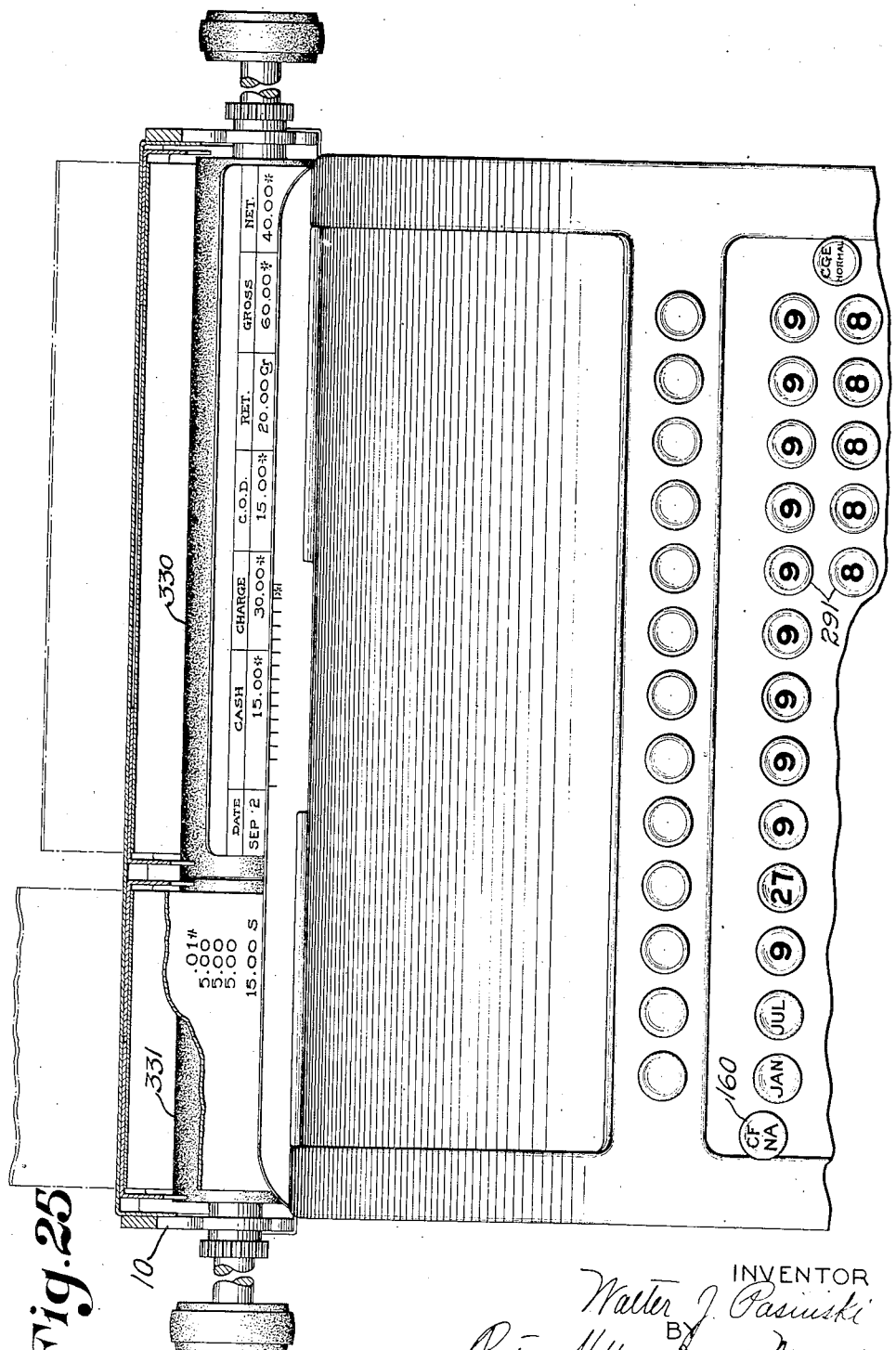

Patented Oct. 14, 1930

1,778,506

UNITED STATES PATENT OFFICE

WALTER J. PASINSKI, OF DETROIT, MICHIGAN, ASSIGNOR TO BURROUGHS ADDING MACHINE COMPANY, OF DETROIT, MICHIGAN, A CORPORATION OF MICHIGAN

ACCOUNTING MACHINE

Application filed July 19, 1926. Serial No. 123,397.

The invention relates to an accounting machine.

Its general object is to provide an improved accounting machine capable of performing a wide variety of bookkeeping functions, particularly one in which a number of different functions may be performed simultaneously such as the simultaneous subtraction and adding of items being listed and the storing of totals or subtotals that may have been obtained in the machine by adding or subtracting operations or both.

A clearer understanding of the invention will be promoted by first referring to a few simple examples of the work to be done. In banking work, the bookkeeper must take a customer's old balance, subtract checks against it, add deposits, and strike a new balance. A machine of the Burroughs type for doing this work is shown in Rinsche Patent No. 1,172,484, February 22, 1916. The old balance may be put in this machine, the checks subtracted, the deposits added and a new balance obtained. It is desirable, however, to store the new balances in the machine so that a total of the new balances may be obtained when all accounts have been posted. This cannot be done in the machine of the Rinsche patent and the present invention relates to an improvement for accomplishing this result among others. It is also desirable to have a total of the checks that have been subtracted in the above example in order that this total may be compared with a pre-list which is usually furnished the bookkeeper.

The present invention provides a machine in which the checks may be added separately at the same time they are subtracted from the old balance. A wide variety of other operations and groups of operations may be performed as will appear later, the machine being highly flexible so that it may be easily adapted to different special accounting and statistical systems.

Some of the objects of the invention are:

To provide an improved construction by means of which items may be listed and added in one counter and simultaneously substracted from another;

To provide an improved machine in which items may be listed and simultaneously added in two counters;

To provide a machine in which a total may be taken of the amount in either counter including a true negative total or overdraft in the subtraction counter;

To provide a machine in which a total may be transferred from either counter to the other including the transfer of a negative total from the subtraction counter to the other counter.

To provide an improved construction by means of which a total may be taken from one counter and simultaneously subtracted from another;

To provide an improved machine in which a sub-total may be taken on either counter and transferred to the other; and To provide a machine in which a sub-total may be taken on one counter and simultaneously subtracted from any amount already accumulated in the other, or if no amount is standing in said other counter to show a true negative total in said counter.

Other objects are to provide an improved mechanism for controlling two separate counters by means of one total key; to provide an improved non-add controlling mechanism for the counters; to provide an improved means for moving one of said counters into and out of active position; and to provide an improved carrying or transfer mechanism.

Other objects and advantages of the invention will hereinafter appear.

An embodiment of the invention is shown in the accompanying drawings, in which:

Fig. 3 is a partial side view showing the lower counter and its controls in normal position.

Fig. 4 is a perspective view of the left end of the lower counter and its controls viewing these parts from the rear.

Fig. 5 is a fragmentary section showing the shaft mounting for the counter pinions.

Fig. 6 is a perspective view of the rock shaft and associated parts for moving the lower counter into and out of active position.

Fig. 7 is a perspective view of the cams for moving the rock shaft illustrated in Fig. 6.

Fig. 8 is a fragmentary plan view of the lower counter and its actuating mechanism and controls.

Fig. 11 is a side elevation of the lower counter showing the carrying mechanism in normal position.

Fig. 12 is a side elevation of the lower counter showing the carrying mechanism tripped to initial carry position.

Fig. 13 is a side elevation of the lower counter showing the carrying mechanism in the position it occupies after a carrying has been effected.

Fig. 14 is a partial left side elevation showing both counters and their controls with the controls for the upper counter in non-add position and the parts of the lower counter in position for resetting the carrying mechanism.

Fig. 15 is a fragmentary left side elevation showing the controls at the upper part of the machine with the control lever for the lower counter in sub-total position, with the controls for the upper counter in non-add position, and with the total key depressed.

Fig. 16 is a fragmentary side elevation of certain of the control parts showing particularly the inter-relation between the non-add control for the upper counter, the controls for the lower counter, and the total key.

Fig. 17 is a fragmentary side elevation showing how the non-add controls for the upper counter and the controls for the lower counter are released by the rocking bail of the machine when operation has been completed.

Fig. 18 is a fragmentary side elevation and section illustrating how the non-add control mechanism for the lower counter is also released by the rocking bail of the machine as an operation is completed.

Fig. 19 is a perspective view showing the interlock between the carrying mechanism and the controls for the lower counter for preventing operation of the controls if the carrying mechanism is not in normal position.

Fig. 20 is an enlarged view of a portion of the mechanism illustrated in Fig. 19.

Fig. 21 is a fragmentary side elevation illustrating the inter-lock between the controls for the lower counter and the subtraction lever to prevent movement of the lower counter controls when the subtraction lever is shifted before the machine has been given the necessary spacing strokes to put it in normal position.

Fig. 22 is a perspective view showing the so-called negative total lock.

Fig. 23 is a partial side elevation showing the negative total lock with the parts in the position they occupy when the machine is in condition for addition and a positive total is in the upper counter.

Fig. 24 is a partial side elevation similar to Fig. 23 showing the position of the parts when a negative total is in the upper counter and the controlling lever is placed in addition position.

Fig. 25 is a partial plan view of the rear end of the machine showing an example of work.

Figure 1:
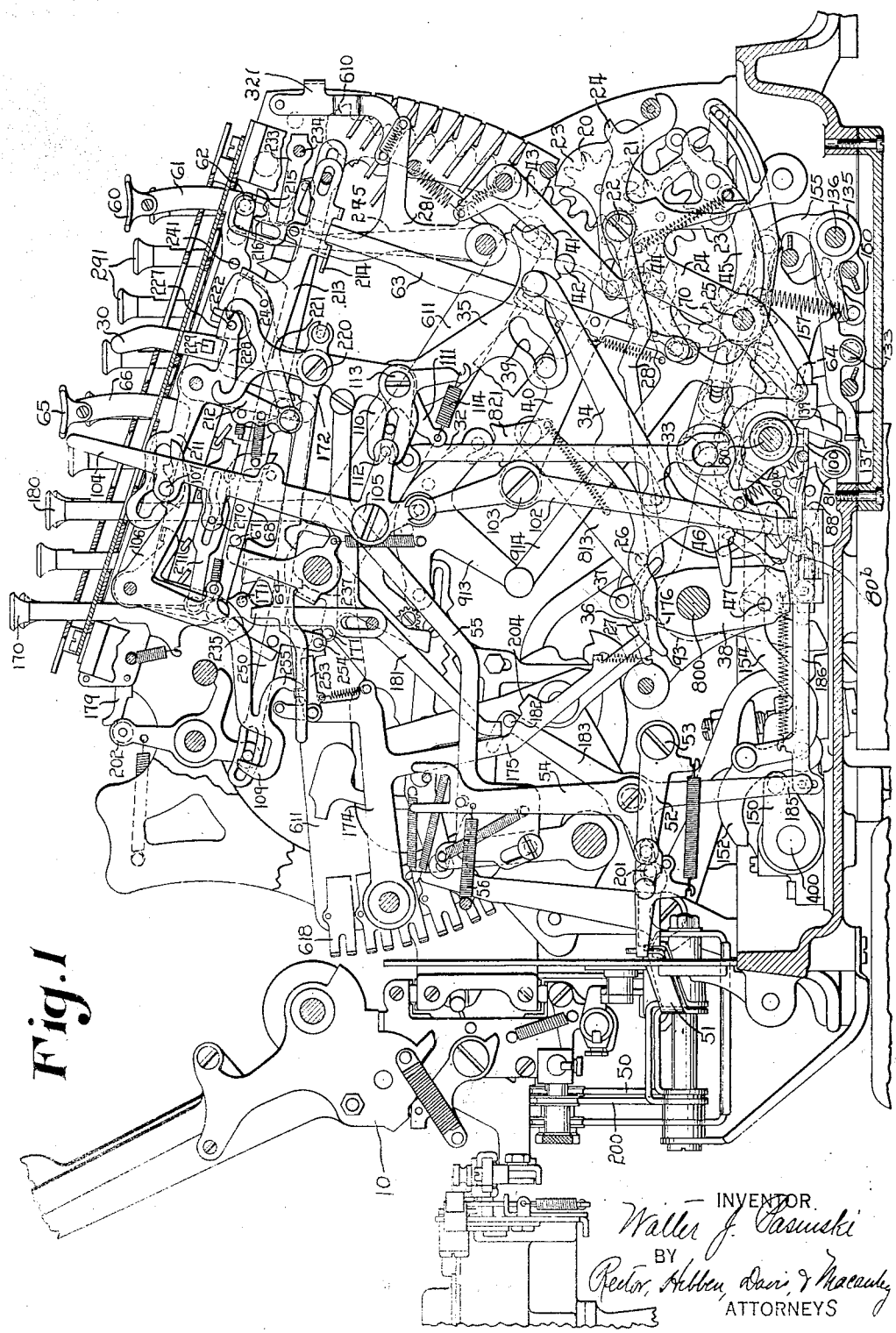
Fig. 1 is a left side elevation of the machine with the casing removed.

The invention is illustrated in connection with the Burroughs type of adding and listing machine although not necessarily limited in its application thereto. In order to avoid unnecessary description of various well known features of the Burroughs machine, reference is made to Burroughs Patents No. 504,963 and No. 505,078 issued September 12, 1893, and to others that will be mentioned from time to time which clearly illustrate and describe in detail the various Burroughs constructions that will be referred to only generally in this application.

GENERAL STRUCTURE

The machine is provided with the familiar reciprocatory racks or actuators 610, mounted in the usual way for carrying purposes on levers 611 having a segmental series of type plates 618 at their rear ends with which is associated the usual Burroughs printing mechanism. These actuators are normally upheld by a swinging frame or bail 617 (Fig. 14) and are individually released and their descent controlled by the usual stop wires set in the familiar way by the depression of amount keys 291. The mechanism is actuated by the rock shaft 800 which is oscillated by a second rock shaft 400 that in turn is oscillated by the handle of the machine or by a motor. An arm 813 fixed to the rock shaft 800 carries a pass-by pawl 821 positioned to engage studs on the three armed lever 913 connected to the pitman 914 that rocks the accumulator or counter into and out of engagement with the actuator racks.

The various keys and controls of the machine are restored to normal position by a release bail 202 (Fig. 17) which is rocked forward by the full stroke sector 311 that strikes the downwardly projecting arm of a three armed lever 312 at the end of the return stroke of the operating mechanism. The rearwardly extending arm of the three armed lever 312 carries a pivoted pass-by pawl 313 that strikes a cam roller 314 on the end of one of the arms 315 carrying the release bail 202.

AUTOMATIC CARRIAGE

The machine is motor operated and fully automatic, provision being made for the paper carriage to tabulate automatically; for the machine to be automatically conditioned for different operations in different columnar positions of the carriage; for the carriage to automatically return to its starting position and line space after it has tabulated across the machine; and for the carriage to be automatically returned or moved to predetermined positions by depression of certain control keys.

The carriage is illustrated in Fig. 1 being designated generally by the reference numeral 10. This carriage, its connection with the machine, and the motor control therefor are substantially similar to those described in Muller Patent No. 1,397,774, November 22, 1921, and Rinsche Patent No. 1,580,534, April 13, 1926, to which reference may be had for details. It is provided with a normal key operating like that shown in Kilpatrick Patent No. 1,152,517, September 7, 1915, whose depression disables the carriage tabulating mechanism and enables the line spacing means. The carriage may control the automatic split or cipher cut out as shown in said Kilpatrick patent and in Gascon No. 1,395,991, November 1, 1921, so that by the use of a split platen illustrated in Fig. 25 and of the mechanism described in said patents operations on a separate list or proof sheet may be carried on at the same time that posting is done.

Although the machine is primarily automatic, the description of its mechanism will be more easily understood by following through the operations without regard to how they are controlled and in some cases as though they were hand controlled but it will be understood that the various operations are automatic and that the various groups of operations of which the machine is capable are controlled in the sequence desired by adjustment of the automatic controlling mechanism.

UPPER COUNTER

The upper counter will both add and subtract and it is referred to as the upper or subtraction counter, but it will be understood that wherever the term subtraction counter is used it is used only for convenience in distinguishing the upper from the lower counter and that the subtraction counter will add as well as subtract.

The upper counter and its controls are of the type shown and described in Rinsche Patents No. 1,172,484, February 22, 1916 and No. 1,179,564, April 18, 1916 and the mechanism will be described only generally here, reference being made to said patents for details.

The counter comprises two sets of pinions 20 and 21 in mesh with each other and mounted on opposite sides of the pivot 22 of a rocking cradle 23 mounted in a rocking counter frame 24 which, in turn, is pivoted on frame studs 25 on the side frames of the machine. The position of the cradle determines which set of pinions shall engage the actuator racks 610 when the frame 24 is moved to engage the counter with the racks. When the pinions 20 are engaged with the racks they are rotated in one direction to perform addition and when the pinions 21 are moved into engagement with the racks, the rotation of these pinions will rotate the pinions 20, which are then out of engagement, in the opposite direction with the result that subtraction is performed.

ADDITION OR SUBTRACTION ON UPPER COUNTER

The upper counter is normally in mesh with the actuator racks as shown in Fig. 1. At the beginning of the forward stroke of the machine, the arm 813 is rocked counter-clockwise, causing the pass-by pawl 821 to rock the three armed lever 913 counter-clockwise to move the pitman 914 forward or to the right in Fig. 1. The upper branch of the forward end of the pitman 914 engages a stud on the counter frame to rock the counter out of engagement with the racks. The counter remains out of engagement with the racks during their descent and until just at the end of the forward stroke of the machine when a stud 26 on the oscillating arm 813 engages a shoulder 27 on the link 28 connected to the counter frame thereby pulling the link rearward to rock the counter frame to move the counter into engagement with the racks so that, when the racks are returned to normal position, the amount set up in the machine will be transferred additively to the counter. Upon the return stroke of the machine, the arm 813 is rocked clockwise and its pass-by pawl 821 would normally engage a stud on the three-armed lever 913 to rock that lever clockwise to pull the pitman 914 to the rear but the pitman is normally connected to the counter frame as shown in Fig. 1 and since that frame has already been rocked back to the position of Fig. 1 by the link 28 the lever 913 has already been returned clockwise to the position of Fig. 1 and action by the pass-by pawl is unnecessary.

Subtraction is performed in the same way except that the cradle is positioned so that the lower set of pinions 21 is brought into engagement with the racks instead of the upper set 20. This causes the pinions 20 to be rotated in the opposite direction to subtract from the counter the amount set up in the machine.

The carrying mechanism for the upper counter is of the familiar Burroughs type and is described in detail in Rinsche Patent No. 1,172,484 to which reference is made, the same carrying mechanism serving both sets of pinions in the upper counter. The automatic means for supplying the "fugitive 1" at the proper time is also described in said patent and the same construction is used in the present machine but, in order to avoid confusion, it will not be illustrated or described in detail, reference being made to the patent.

SUBTRACTION CONTROLLING MEANS

The position of the cradle carrying the two sets of pinions in the upper counter frame is determined by a lever 30, which, for convenience, is called the subtraction lever, although it conditions the machine for addition as well as subtraction.

The lever 30 is pivoted at 31 (Fig. 14) and provided with a rearwardly extending arm connected to a vertical link 32 having a lateral arm 33 carrying a roller operating in a cam slot in a pitman 34 pivoted at its forward end to a cam lever 35. The lower end of the link 32 is forked and the forked end extends over a stud in the machine which guides its vertical movement. As illustrated in Fig. 1, the lever 30 is in "addition" position. When it is pulled forward from this position to the "subtraction" position it raises the link 32 and the pitman 34 thereby positioning a shoulder 36 on the pitman in the path of a stud 37 on a plate 38 fixed to the oscillating shaft 800. Accordingly, during the forward stroke of the machine the stud 37 engages the shoulder 36 and pulls the pitman 34 to the rear.

The pitman 34 pulls the lever 35 clockwise about its pivot 31 and this lever has a cam slot 39 in which travels a roller on a pivoted arm 40 whose forward end is forked and engages over a stud on a rearwardly projecting arm of the cradle 23 carrying the two sets of counter pinions. When the pitman 34 is moved to the rear the arm 40 is moved counter-clockwise which rocks the upper set of pinions out of position to engage the racks and places the lower set in position to engage the racks. This rocking movement occurs during the forward stroke of the machine and after the upper counter is moved out of engagement with the racks by the pitman 914. This disengagement of the counter from the racks takes place before the cradle is rocked so that the pinions are free of the racks when the rocking action occurs.

The forward end of the arm 35 has a double nosed cam end 41 operating on a stud 42 on a pivoted arm 43 whose lower end engages a stud 44 on a locking lever 45 that locks the cradle in either of its two positions. When the pitman 34 moves either forwardly or rearwardly the first action of the cam arm 41 is to unlock the cradle after which the cradle is moved through the medium of the forked arm 40 and its connections.

When the subtraction lever 30 is moved to "addition" position after a subtraction has been performed, the link 32 and its pitman 34 are moved downwardly to put a shoulder 46 on the lower arm of pitman 34 into the path of a stud 47 on the oscillating plate 38, so that, during the forward stroke of the machine, the pitman 34 is thrust forwardly to move the cam arm 35 counter-clockwise which cams the arm 40 clockwise to position the upper pinions for engagement with the racks when the counter frame is rocked to mesh the counter with the racks.

CARRIAGE CONTROL OF UPPER COUNTER

The position of the subtraction lever is controlled automatically from the paper carriage so that by setting rollers or tappets on the carriage the machine will automatically add or subtract in the upper counter depending upon the columnar position of the carriage. The details of the mechanism are described in Rinsche Patent No. 1,179,564 and Muller Patent No. 1,397,774, November 22, 1921 and will be only briefly referred to herein. Suitable rollers on the carriage act on one arm 50 of a yoke (Fig. 1) whose other arm 51 is connected to a lever 52 pivoted at 53. Lever 52 has an inwardly extending stud engaging a rearwardly extending arm on a pivoted bell crank lever 54 whose upper end carries a stud adapted to engage a slot in a link 55 connected to the subtraction lever 30. When the mechanism is conditioned for automatic operation, if the roller or tappet on the carriage strikes the arm 50 it rocks it to rock the arm 52 clockwise which in turn rocks the arm 54 clockwise and thrusts the link 55 forward to push the subtraction control lever to "subtraction" position. This conditions the machine to perform subtraction as hereinbefore described. The lever 54 is automatically returned to its original position by a spring 56 so that the subtraction control lever is returned to "addition" position after the machine has operated unless the next succeeding roller on the carriage maintains the subtraction lever in subtraction position.

TOTAL AND SUB-TOTAL ON UPPER COUNTER

When a total is to be taken on the upper counter the total key 60 is depressed, said key being connected to a bell crank lever 61 carrying a stud 62 positioned so as to act on a link 63 connected to the pitman 914. Depression of the total key moves the pitman downward so that its upper branch is out of the path of the stud on the counter frame and consequently the frame will not be moved to throw the counter out of engagement with the actuator racks when the pitman is moved at the beginning of the forward stroke of the operating mechanism. If the counter is in engagement with the racks no movement of the frame will take place during the initial part of the forward stroke, but if the counter should be out of engagement with the racks the lower branch of the pitman 914 is in position to engage the lower stud 64 on the counter frame to rock the counter into engagement with the actuator racks and the counter remains in engagement with the racks during their descent. Since it is in engagement at the end of the forward stroke of the machine the stud 26 on the oscillating arm 813 does not act on the link 28 as the link has already been moved rearwardly.

At the beginning of the return stroke the pass-by pawl 821 acts on a stud on the three-armed lever 913 which is thereby rocked clockwise to pull the pitman 914 rearwardly. The lower branch of the pitman being in engagement with the stud 64 on the counter frame, the pitman rocks the frame to move the counter out of engagement with the racks at the beginning of the return stroke of the machine and just prior to the ascent of the racks. This manner of taking a total is well known in Burroughs machines and need not be described in further detail, reference being made to the Burroughs patents heretofore mentioned.

When a sub-total is to be taken the sub-total key 65 is depressed, the stem of said key acting on the total key bell crank lever 61 to move the link 63 downward to disable the connections for moving the upper counter out of engagement with the racks at the beginning of the forward stroke. In the taking of a sub-total it is necessary to allow the counter to remain in engagement with the racks during their ascent instead of disengaging it prior to the ascent of the racks as in taking a total. The bell crank lever 66 to which the sub-total key stem is connected is connected to a link 67 (Fig. 15) having a stud 68 which, when the sub-total key is depressed, strikes the upper end of a pivoted lever 69 and rocks it to the position shown in Fig. 14 to disable the pass-by pawl 821 thereby preventing the three-armed lever 913 from being rocked clockwise to move the pitman 914 to disengage the counter.

NEGATIVE TOTAL OR SUB-TOTAL ON UPPER COUNTER

A true negative total or sub-total may be taken on the upper counter by taking a total or a sub-total in the usual way when the subtraction lever is in "subtraction" position. In such event the pinions 21 are engaged with the racks instead of the pinions 20 and the true negative amount or overdraft is printed from them. The fugitive one is automatically taken care of by mechanism provided for that purpose described in detail in Rinsche Patent No. 1,172,484, February 22, 1916, to which reference is made.

LOWER COUNTER

The lower counter is an independent adding accumulator cooperating with the same racks 610 as the upper counter, said racks being made longer than usual in order to engage with the lower counter.

The lower counter comprises a series of pinions 70 mounted on a sleeve 71 (Fig. 5) carried by a hollow shaft 72. The pinions are mounted in a novel manner which enables them to rotate freely about the sleeve with minimum friction. Each has an internal concave race 73 for the reception of ball bearings 74. A hub member is provided for each pinion, one side of which 75 is inclined to hold the ball bearing in place and the other side of which is straight at the time the pinion is assembled on the hub. After the pinion is assembled and the ball bearings are in place, the other side of the hub is spun and crowded up until it occupies the inclined position 77 and combines with the other surfaces to hold the ball bearings in place. The shaft on which the pinions are rotatably mounted is carried by two side plates 78 and 79 (Fig. 8) pivoted to the shaft 80 and connected together by suitable tie rods to form a movable lower counter frame. The lower counter frame is rocked on the shaft 80 to move the pinions into and out of engagement with the racks by a novel cam mechanism as follows:

Slidably mounted on the shaft 80 is a yoke 81, one arm of which is connected to a sleeve 82 by means of which the yoke is slid along the shaft and the other arm of which has an extension 83 provided with an opening loosely receiving the rod 84 which permits sliding motion of the yoke but prevents it from rotating relative to the shaft 80. The yoke has oppositely extending projections, one extending up and the other extending down, to the outer ends of which are pivoted pass-by pawls 85 and 86 (Fig. 10) carrying cam rollers 87 and 88 respectively. The pawls are normally drawn toward one another by springs 89 and 90 connected to their respective pawls and to the yoke. Movement of the pawls toward one another is limited by engagement of their respective studs 91 and 92 with suitable stops on the yoke.

The lower counter is moved into and out of engagement with the racks by a cam 93, illustrated in Fig. 7, which engages the cam rollers above described. This cam is fixed to the shaft 800 and oscillates back and forth with it. It has a plurality of cam surfaces formed by the ends of metal plates that are riveted together to form the cam, these cam surfaces being spaced laterally so that by shifting the yoke 81 carrying the cam rollers different surfaces on the cam 93 become active in moving the counter frame.

Addition on Lower Counter

When the lower counter is to be used for addition the two cam surfaces 94 and 95 which are in line vertically are employed. The normal position of the parts is illustrated in Fig. 3 where the counter is out of engagement with the racks. Assuming that the yoke 81 is in a position such that its cam rollers will be engaged by the cam surfaces 94 and 95, it will be clear that, when the cam is rotated counter-clockwise with the shaft 80a, the cam surface 94 will pass the roller 87 since the latter will yield against the tension of its spring 89. The counter will not be moved until just as the operating mechanism finishes its forward stroke when the cam surface 95 will engage the cam roller 88, which is below the center of the pivot of the counter frame, and rock said frame in a counter-clockwise direction to move the counter into engagement with the actuator racks. During this movement of the cam 93 the surface 95 is moved slightly beyond the cam roller 88 and upon the return stroke of the machine it will pass the roller and no movement of the counter frame will take place until the cam surface 94 has returned to a position where it will engage the roller 87 which was moved into its path by the movement of the counter into engagement with the racks. The counter is held in the position to which it is rocked by the engagement of a pointed member 80ª (Fig. 6) on the shaft 80 with a spring-pressed detent 80ᵇ shown in Fig. 1. The contact of the cam surface 94 with the roller 87 takes place during the final part of the return stroke and serves to rock the counter frame clockwise to disengage the counter from the racks at the end of the return stroke and after the racks have been returned to their normal position. The counter is thus kept out of engagement with the racks during their descent; is moved into engagement with them at the end of the forward stroke of the machine and prior to the return of the racks to normal position; is allowed to remain in engagement with the racks during their ascent to thereby add the amount in the counter; and finally is disengaged from the racks at the end of the return stroke of the machine.

Total and Sub-Total on Lower Counter

When a total is to be taken it is necessary to have the counter in engagement with the racks during their descent and out of engagement with them while they are being returned to normal position. For this purpose the cam surfaces 96 and 97 have been provided and the yoke carrying the cam rollers is moved laterally to position the cam rollers in the path of said surfaces. With the cams in the position illustrated in Fig. 3, if the machine is operated, the cam surface 97 will strike the cam roller 88 at the beginning of the forward stroke and rotate the counter frame counter-clockwise to move the counter into engagement with the racks. The cam surface 96 passes the cam roller 87 and beyond it but does not thereby move the counter frame because the cam roller 87 yields against the tension of its spring 89. At the beginning of the return stroke, however, the cam surface 96 engages the cam roller 87 and rocks the counter frame clockwise to move the counter out of engagement with the racks prior to their being returned to normal position. During this movement the cam surface 97 passes the roller 88 which yields against the tension of its spring 90 and the parts are returned to normal position illustrated in Fig. 3.

When a sub-total is to be taken the cam surfaces 98 and 99 which are in vertical alignment, are employed. The cam surface 99 is in the same radial position as the surface 97 as will be clear from Fig. 7 and its action will be clear by reference to Fig. 3 where surface 97 is illustrated. At the beginning of the forward stroke the cam surface 99 engages the cam roller 88 and rocks the counter frame counter-clockwise to move the counter into engagement with the racks. In taking the sub-total, it is not desired to move the counter out of engagement with the racks during the return movement of the latter and consequently there is no provision for such movement of the counter frame. The cam surface 99 remains inactive during the remainder of the forward stroke and during the return stroke. In returning to its original position it passes the cam roller 88 which yields against the tension of its holding spring 90. During the final part of the return stroke the cam surface 98 strikes the cam roller 87 which has been moved into its path by the movement of the counter into active position and it thereupon rocks the counter frame clockwise to move the counter out of engagement with the racks after they have been returned to their normal position.

The yoke 81 carrying the cam rollers 87 and 88 is slidably moved to its various positions on the shaft 80 by means of a bell crank lever 100 (Fig. 8), one arm of which has a pin engaging in an annular groove in the sleeve 82 connected to the yoke 81 and the other arm of which has a stud engaged by the forked end 101 of a lever 102 (Fig. 1). The lever 102 is pivoted at 103 and its opposite end is connected to the lower end of a counter control lever 104, pivoted at 105.

This control lever normally occupies a neutral position such as shown in Fig. 1 in which position the yoke 81 is in its central position with the cam rollers 87 and 88 in position to be acted upon by the adding cam surfaces 94 and 95 so that the machine normally adds in the lower counter. When the control lever 104 is moved forward to "total" position the lower end of lever 102 is also moved forward which moves the bell crank lever 100 counter clockwise as viewed in Fig. 8 and moves the yoke 81 with its cam rollers to the right to a position to make the surfaces 96 and 97 active for taking a total. When a sub-total is to be taken the control lever 104 is moved rearwardly which also moves the lower end of lever 102 to the rear which in turn moves the bell crank lever 100 clockwise to move the yoke 81 with its cam rollers to the left to a position to make the cam surfaces 98 and 99 active for taking a sub-total.

The control lever 104 is held in its central or neutral position as well as in its sub-total or total positions by a pivoted latch 106 (Fig. 17) having notches in its upper edge engaged by a roller stud 107 carried by the lever 104. The latch is urged in a counter clockwise direction by a spring 108 which maintains the notches in engagement with the stud. When the lever is moved from one position to another this stud rides over the raised surfaces between the notches and the latch snaps into position to hold the lever in its new position. The latch is released by the restoring bail 202 of the machine, the lower end of the supporting arm 315 of which carries a stud that engages the hooked end 109 of the rearwardly extending arm of the latch 106 so that when the restoring bail is rocked clockwise at the end of the return stroke of the machine to restore the keys to normal position it also rocks the latch 106 clockwise and releases the control lever which is returned to its central position by a pair of spring held elbow levers 110 and 111 engaging over a stud 112 on a laterally extending projection of the control lever 104. These elbow levers are pivoted at 113 and a spring 114 connects them. This construction insures that the control lever 104 will be returned to central position from either its total or its sub-total position when the latch 106 is released.

In order to insure that the lower counter will be returned to its normal position in the event the handle is operated a short distance and released before the full stroke sector pawl has come into action, the lower counter frame is provided with an arm 115 (Fig. 3) positioned so that it will be engaged by the member 116 on the full stroke sector when the sector returns to normal. The counter will thus be moved out of engagement with the racks if it should be moved partially into engagement with them by the mis-operation referred to.

Transfer Mechanism—Lower Counter

The transfer mechanism for the lower counter is illustrated in Figs. 11, 12 and 13 where it is shown in three different positions and in Fig. 4 which shows it in perspective.

This mechanism includes a series of transfer segments 120 pivoted on a shaft 121 and normally urged in a counter-clockwise direction by springs 122. Each segment is held against movement in this direction by a detent 123 formed by an arm of a yoke 124 pivoted on a shaft 125 the other arm 126 of the yoke extending upwardly and rearwardly and being provided with a nose 127 adapted to be engaged by a stud 128 on the arm 129 of a trip pawl 130. Each of the counter pinions 70 has one wide tooth 131 for tripping its respective pawl 130 when the pinion moves from 9 to 0. The pawl 130 also serves as a stop for limiting the rotation of the pinion when the counter is being restored to 0 in taking a total or sub-total. The pawl 130 for any one pinion controls the detent for the carrying or transfer segment of the pinion of next higher order. The yoke construction of the detent 123 and arm 126 offsets each detent and arm so that the tripping pawl 130 operates the detent 123 that controls the carry segment for the pinion of next higher order. The springs for the carry segments are connected at their opposite ends to the yokes 124 and carry segments 120 so that the same springs serve to actuate the carry segments and the detents.

The operation of the transfer mechanism is as follows:

The parts normally occupy the position illustrated in Fig. 11 during the descent of the racks. After the racks have descended to their differential positions, the counter pinions are rocked out of engagement with the transfer segments and into engagement with the racks and the restoring bail 133 moves upwardly to restore any tripped transfer segments after which it settles back a short distance to permit the transfer segments to move to initial carry position as will be later explained. As one of the pinions rotates from its 9 to its 0 position or beyond in a clockwise direction viewed in Fig. 12, the wide tooth 131 cams the tripping pawl 130 counter-clockwise which pushes the nose 127 on arm 126 downward and raises the detent 123 from behind a shoulder on the carry segment 120. The spring 122 then snaps the carry segment rearward a short distance to the position shown in Fig. 12 where the tail 132 of the segment contacts the bail 133. This tripping action occurs during the time that the pinions are in engagement with the actuating racks during the return stroke of the machine and is what is called the "initial carry"—that is, the carry segments are tripped and they move a slight distance to a position such that a carry will be effected when the segments are released. Each tripped carry segment 120 moves under the shoulder 134 on the detent 123 which prevents the detent 123 from moving back to its normal position.

Near the end of the return or rearward stroke of the machine the bail 133 is lowered which releases the carry segments and the ones that have been tripped are immediately moved rearward by their springs 122 thereby rotating their respective pinions the distance of one tooth to effect the carry. The bail is not lowered until the pinions are disengaged from the racks so that the carry does not take place until the pinions are free.

The construction, operation, and timing of the bail 133 which holds the carry segments in their "initial carry" position and which also acts to restore them to normal position is a novel feature of the machine. The bail is carried by two side arms 135, fixed to the shaft 136, (Fig. 11), one of said arms having an extension provided with a laterally projecting end or shoulder 137 operating between the two pivoted latches or detents 138 and 139. The latches are pivoted at 140 to an extension 140ª of an intermediate plate of the counter frame above the shaft 80 to which the counter frame is fixed and about the axis of which it is rocked. A spring 141 serves to normally urge the two latches toward one another. It will be clear that when the counter frame is rocked the downwardly projecting ends of the latches will be rocked to the right or left depending on the direction of movement of the frame, and that they may be moved relative to one another by the projection 137 on arm 135.

Figure 9:
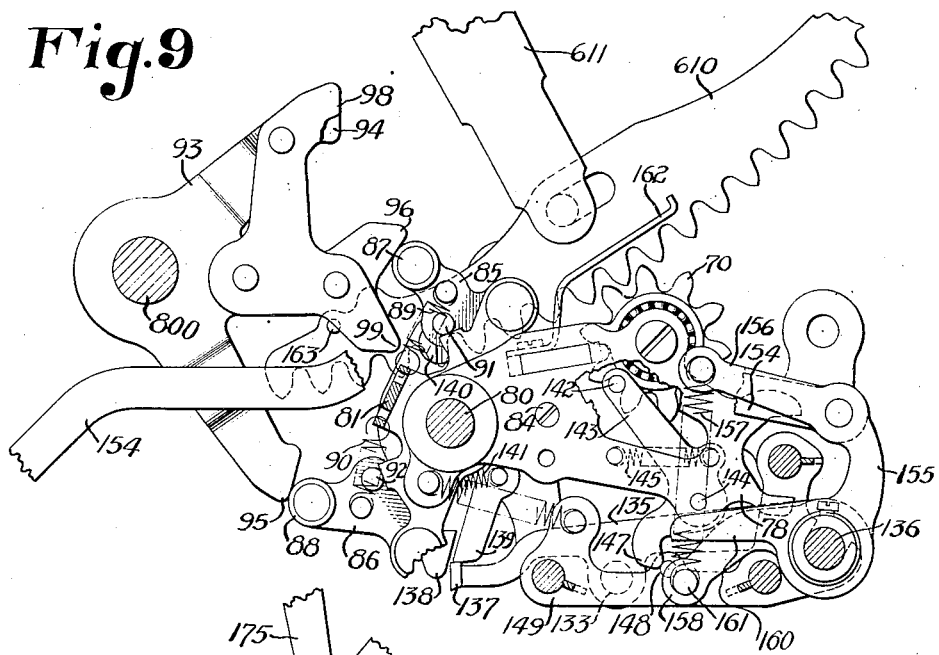
Fig. 9 is a fragmentary side elevation showing the lower counter in its mid-position as it moves into and out of active position.

Normally the parts occupy the position shown in Fig. 11. On the forward stroke of the machine the bail 133 and its arms 135 are urged upwardly by means hereinafter described but at the beginning of the stroke the pinions 70 are in engagement with the carry segments and it is not desirable to move the segments immediately. Accordingly the parts are coordinated so that the shoulder 137 on arm 135 is blocked against upward movement by the lower end of the detent 139 as shown in Figs. 11 and 9. As the counter frame is rocked to move the pinions into engagement with the racks near the end of the forward stroke of the machine, the pivot 140 of the latches 138 and 139 moves counter-clockwise from the Fig. 11 to the Fig. 12 position and the lower ends of both latches move to the right. The nose on the end of latch 138 engages the shoulder 137 and the latch is held against further movement while the latch 139 moves away from it and eventually clears the shoulder 137 whereupon the arm 135 with its shoulder 137 and the bail 133 is snapped upwardly to restore the carry segments and the latch 138 snaps counter-clockwise under the tension of spring 141. The timing is such that the bail is not released until the counter pinions are out of engagement with the carry segments and it will be noted that the timing depends on the movement of the counter frame for moving the pinions out of engagement with the segments. The bail is moved slightly higher than the position illustrated in Fig. 12 in order to insure that all the segments will be returned to normal position, such position being illustrated in Fig. 14, and when it is released it drops back onto the nose of pawl 138 where it is held as shown in Fig. 12.

When the initial carry takes place the bail is in the position of Fig. 12, but as the counter frame is moved to move the pinions out of engagement with the racks and into engagement with the carry segments, it swings in a clockwise direction around the axis of shaft 80. This rotates the pivot 140 of the latches 138 and 139 to the right from the Fig. 12 to the Fig. 13 position and swings the lower ends of the latches to the left to disengage the nose of latch 138 from under the shoulder 137 on arm 135 so that the shoulder passes between the jaws of the latches to the position illustrated in Fig. 13. Here again the movement of the bail is controlled by movement of the counter frame and it is timed so as not to be released until the pinions have been moved out of engagement with the racks so as not to release the carry segments from their initial carry position until the pinions are free of the racks and in engagement with the carry segments.

Provision is also made for holding the counter pinions against movement during the time they are being moved into and out of engagement with the racks. For this purpose a bail 142 (Fig. 9) is provided carried by side arms 143 pivoted at 144 to the counter frame to cause the bail to move with the frame. This bail is normally urged in a counter-clockwise direction by a spring 145 which seats the bail in a plurality of slotted stops 146. One of the arms 143 has a cam nose 147 adapted to engage a stud 148 on a stationary cross brace. As the counter is moved into engagement with the racks, the cam nose 147 engages the stud and gives the bail a quick throw from the position of Fig. 11 to that of Fig. 9 where the bail seats itself between the teeth of the pinions and prevents their accidental displacement while they are in intermediate or transitory positions, such as shown in Fig. 9. As the pinions engage the racks the nose 147 passes over the top of stud 148 to the position of Fig. 12 which allows the spring 145 to quickly return the bail to its seat in the stops 146. As the pinions are moved out of engagement with the racks the nose 147 passes over the stud 148 in the opposite direction which again throws the bail into engagement with the pinions to hold them against movement until they have reached their position in engagement with the carry segments as shown in Fig. 11.

It is desirable to have the carry segments restored to normal position quickly and hence proper provision must be made for actuating the bail 133 quickly, but it is not desirable to require a sudden increase in the power required to operate the machine at the end of the stroke. Accordingly, provision has been made for gradually and evenly storing power during the forward stroke of the machine which is made available to quickly actuate the bail 133 to restore the carry segments. The oscillating shaft 400 carries an arm 150 (Figs. 3 and 14) having a stud 151 engaging the under side of a curved arm 152 pivoted at 153. This arm is connected by a link 154 to a member 155 (Fig. 9) loosely mounted on the shaft 136. Connected to a rear extension 156 (Fig. 3) of this member is one end of a spring 157 whose other end is connected to an arm 158 fixed to the shaft 136 which carries the side arms supporting the restoring bail 133. During the forward stroke of the machine the curved arm 152 is gradually rocked clockwise which thrusts the link 154 forward and rocks the arms 155, 156 clockwise thereby gradually tensioning the spring 157 since the arm 158 cannot move owing to the fact that the shoulder 137 on arm 135 fixed to shaft 136 is blocked by the latch 139 as shown in Fig. 9. As the end of the forward stroke of the machine is reached the counter is rocked into engagement with the racks which releases the shoulder 137 on arm 135 and permits the bail 133 to be snapped upward very quickly by the spring 157. It will be noted that the power that is thus stored in the spring is stored gradually during the forward stroke but it is made available quickly without requiring the application of a sudden additional force by the operator toward the end of the forward stroke.

The link 154 connecting the curved arm 152 and the member 155 is moved forwardly against the tension of a spring 159 (Fig. 3) on the forward stroke and this spring serves, after the restoring bail has acted and moved to the position shown in Fig. 12, to tend to move the restoring bail down so that, as soon as the latches 138 and 139 are in the proper position, the bail will drop to the position shown in Fig. 13 near the end of the return stroke. The force of this spring is transmitted to the bail through a lower arm 160 of the member 155 which arm contacts a stud 161 on the arm 158 (Fig. 9).

The counter frame is provided with a comb plate 162 best illustrated in Figs. 11, 12 and 13, the ends of the fingers of which are bent upwardly and positioned to cooperate with studs 163 on the lower ends of the actuator racks 610. These comb plates are to prevent the actuator racks from jumping or rebounding when they are struck by the restoring bail 617 (Fig. 14) that returns them to normal position. If the return stroke of the machine should be sudden this bail might strike the levers 611 carrying the racks 610 with sufficient force to cause the racks to be thrown slightly ahead of the bail and beyond the position to which they should move, thereby carrying the counter wheels beyond their position and if any of these wheels should happen to be in a position to effect the carry, such carry would be effected even though the rack returned to normal position afterwards. The bent ends of the fingers of these comb plates are positioned to engage the studs on the racks to prevent the racks from moving beyond their proper position. These fingers, however, do not interfere with the extra step of movement of the racks which takes place when a carry is effected in the upper counter. This is due to the fact that at any time when a carry is to take place in the upper counter, the lower counter is rocked away from the racks and carries the comb plate out of the path of the movement of the studs as shown in Fig. 13. This might be made clearer by calling attention to the fact that the normal position of the lower counter is out of engagement with the racks, as shown in Fig. 1, to which position it is moved at the end of the return stroke of the machine not only when adding in the lower counter but also when taking a total or sub-total therein. Since the carry in the upper counter is not completed until the racks 610 move up their extra step at the end of the return stroke of the machine, it will be clear that the lower counter always moves away from the racks at a time to prevent interference of the comb plate with the carry movement of racks 610 but at the same time the racks are prevented from being accidentally driven beyond proper position while they are in engagement with the lower counter.

The transfer mechanism has been made the subject-matter of a divisional application, Serial No. 169,787, filed February 21, 1927.

NON-ADD UPPER COUNTER

The upper counter may be placed in non-add position both automatically and by the depression of a key but the mechanism will be more easily understood by first describing the action as controlled by depressing a key.

A non-add key 170 (Fig. 1) is located at the left side of the keyboard and provided with a stem having a stud 171 (Fig. 17) midway of its length engaging a lever 172 pivoted at the front end of the machine to the subtraction lever 30 and provided with a tail piece at its other end engaging over a stud 173 on a lever 174 pivoted at the rear of the machine (Fig. 1) and having a downwardly and forwardly extending arm 175 provided with a curved portion extending over a projecting lip or lug 176 on the link 28. When the non-add key is depressed the link 28 is moved downwardly out of the path of the stud 26 on the oscillating arm 813. Accordingly, the stud 26 does not engage the shoulder 27 as the machine reaches the end of its forward stroke and the upper counter is not rocked into engagement with the actuator racks. Since the counter was moved out of engagement with the racks at the beginning of the forward stroke and is not moved into engagement with the racks owing to the depression of the non-add key, the movement of the said racks has no effect on the counter and there will be no addition or subtraction in the counter.

The lever 174 that is moved downwardly by depression of the non-add key has a forwardly extending projection (Fig. 17) engaging over a stud 177 on the pivoted member 69. When the non-add key is depressed the member 69 is rocked counter-clockwise to the position shown in Fig. 14 where it prevents the pass-by pawl 821 from engaging the stud on the three-armed lever 913. This prevents the counter being moved into engagement with the racks by means of the pitman 914.

The non-add key is latched in its depressed position by a latch 178 illustrated in Fig. 17, which engages in a notch in the key stem. This latch has a rearwardly extending nose 179 positioned so as to be engaged by the restoring bail 202. This bail is operated at the end of the return stroke of the machine and serves to release the depressed non-add key at the same time that the other keys are released.

Non-Add Lower Counter

The non-add for the lower counter is also controlled automatically as well as by the depression of a key and it, too, will best be understood by first describing the key control.

The lower counter non-add key 180 is located at the left side of the keyboard and provided with a long irregular shaped stem ending in a finger piece 181 (Fig. 1) positioned adjacent a stud 182 on the upper arm 183 of a three-armed lever pivoted at 184 (Fig. 14). The downwardly extending arm 185 of this lever is connected by a pin and slot connection to a link 186 whose opposite end carries an inwardly extending stud 187, the normal position of which is shown in Fig. 3. Bearing against the under side of this stud is one arm 188 of a bell crank lever or pawl pivoted on a shaft 189, the other arm 190 of the lever having one end of a spring 191 connected to it. The other end of this spring is connected to a projection on the link 186 so that the spring serves to urge the arm 188 into engagement with the stud 187 and also acts to urge the link toward its normal forward position whenever it is moved to the left as viewed in Fig. 3. A second yoke-shaped pawl is pivoted on the shaft 189, said pawl having one arm 192 whose end is normally in contact with the stud 187 of the link 186 and another arm 193 extending upwardly in position to be engaged by a roller stud 194 on the oscillating arm 813. The pawl of which the arm 188 is a part is yoke-shaped as illustrated in Fig. 4 and the inward side of the yoke has a forwardly extending arm 195 (Fig. 14) positioned to contact the stud on the pass-by pawl 86 carrying cam roller 88 to which spring 90 is connected and which carries the cam roller 88.

When the parts are in the position shown in Fig. 3 with the arm 192 in contact with the stud 187 the upwardly extending arm 193 is out of the path of the roller stud 194 and when the machine is operated the arm 193 is not moved. However, if the link 186 is moved slightly to the rear, that is, to the left as viewed in Fig. 1, which movement may be given it by depression of the non-add key 180 thereby causing the finger 181 to engage the stud 182 and rock the three-armed lever clockwise, the stud 187 moves between the arms 188 and 192 and rocks the pawl 192—193 to the position shown in Fig. 10. This puts the arm 193 in the path of the roller stud 194 so that near the end of the forward stroke of the machine and just prior to the time the cam 95 is about to engage the cam roller 88 to rock the lower counter into adding engagement with the racks, the arm 193 is cammed forward or clockwise which rocks the arm 195 downward into engagement with the stud on the pass-by pawl 86 and thus moves the cam roller 88 out of the path of the cam 95 so that the lower counter is not moved into engagement with the racks and no addition takes place. The non-add key 180 is held in the depressed position by a yoke-shaped pivoted latch 196 (Fig. 18) to one arm of which is connected a link 197 extending to the rear in position to be contacted by the restoring bail 202 whereby when the restoring bail acts to restore the keys of the machine, it also releases the depressed non-add key 180.

In order to prevent the non-add key from being depressed when the lower counter or control lever 104 is in total or sub-total position, the non-add key stem is provided with a lateral extension 198 (Fig. 15) having a slot for the reception of a stud 199 on the control lever. When the control lever is in the sub-total position shown in Fig. 15 or in the total position, which is not illustrated, the slot in the projection 198 does not register with the stud 199 and the non-add key cannot be depressed. It is only when the control lever 104 is in its middle or neutral position that the slot registers with the stud so that the non-add key can be depressed.

Likewise depression of the non-add key prevents the movement of the lower counter control lever 104 because when the key 180 is depressed the stud 199 on the control lever enters the slot in the projection 198 on the non-add key stem which prevents the control lever from being rocked forward or backward (Fig. 18) until the non-add key has been raised to remove the stud 199 from the slot.

Carriage Control of Either or Both Non-Add Functions

Either or both of the counters may be automatically placed in non-add condition by the laterally shifting carriage. For this purpose the carriage is provided with suitable tappets or rollers which engage the arm 200 of a yoke whose other arm extends inwardly and is twisted and extends forward with its forward end astride a stud 201 on the rearwardly extending arm 203 (Fig. 10) of the three-armed lever pivoted at 184. Rollers of different diameter may be provided on the carriage for causing the three-armed lever to be moved to any one of three different positions, the character of the non-add control depending upon the extent of movement of this lever. The normal position of the lever is illustrated in Fig. 3.

Figure 10:
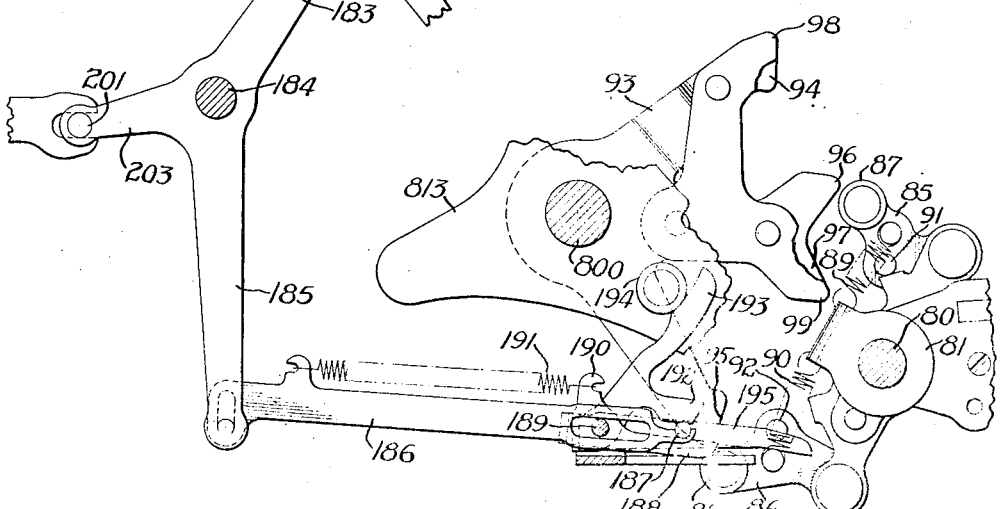
Fig. 10 is a fragmentary side elevation showing the non-add controls for displacing the means for moving the lower counter into active position.

To automatically place the lower counter in non-add position a roller of small diameter is employed which gives the three-armed lever just sufficient movement to move it from the position of Fig. 3 to that of Fig. 10 which corresponds to the movement given it by the depression of the lower counter non-add key 180. The parts which act to place the lower counter in non-add condition by this short movement of the lever 183 have already been explained.

To automatically place both counters in non-add condition a slightly larger diameter roller is employed which moves the three-armed lever further clockwise and to a position such that its stud 182 passes onto a raised portion 204 on lever 175 and cams this lever downwardly. The stud 182 is stopped just beyond the rear corner of the projection 204 on said lever which is sufficient to move the lever 175 downward but which does not cause the lever 183 to be moved enough farther forward to pull the stud 187 from between pawls 188 and 192. The downward movement of the lever 175 puts the link or pitman 28 out of action as already explained so that the upper counter is not moved into engagement with the racks and no addition takes place in the upper counter. The clockwise movement of the lever 183 has moved the link 186 further to the left (Fig. 3) than is necessary to cause a non-add in the lower counter but the stud 187 still remains between the arms 188 and 192 so that the lower counter remains in non-add condition.

To have only the upper counter in non-add condition, a still larger diameter roller is employed which moves the three-armed lever to the position illustrated in Fig. 14. This cams the lever 175 downwardly to place the upper counter in non-add condition but the lever 183 has been rocked so far clockwise that the link 186 has been pulled to the left far enough to pull the stud 187 from between the surfaces of the arms 188 and 192 and into a recess in the arm 192 as illustrated in Fig. 14. This permits the arm 193 to rock down out of the path of the roller stud 194 so that the arm 193 is not rocked down to move the cam roller 88 out of the path of the cam 95, hence the lower counter is not placed in non-add position.

From this description it will be clear that by employing rollers of different diameters either one or both of the counters may be placed in non-add condition in different columnar positions of the carriage.

Use of Main Total or Sub-total Keys for Totaling or Sub-totaling on Lower Counter When the total key is depressed in a Burroughs machine the actuator racks are released for movement in the well known manner, their descent being determined by the amount set up in the counter that is brought into engagement with the racks prior to their descent and which is rotated to zero by their descent. When taking a total on the lower counter it is desirable to have these racks descend but there should be no control of the upper counter by the total key. Accordingly means has been provided under the control of the lower counter control lever 104 for disabling the control of the upper counter by the total key while at the same time permitting the total key to release the racks for total taking purposes.

The lower counter control lever 104 carries a stud 107 (Fig. 15) operating in a slot in the arm 211 of a bell crank lever whose downwardly extending arm 212 is connected to a forwardly extending link 213 having a laterally extending projection 214 (see Fig. 19) which engages the rear side of the link 63 connecting the total key with the pitman 914. Ordinarily the stud 62 on the total key bell crank lever operates in a short slot 215 in the link 63 so that when the total key is depressed the link is pushed downward. But when the lower counter control lever 104 is moved either forward to total position or backward to sub-total position, the bell crank lever 211—212 is rocked counter clockwise which thrusts the link 213 forward and pushes the link 63 forward so that the stud 62 on the total key stem operates in a long slot 216 in the link 63 and depression of the total key has no effect in pushing the link downward. Accordingly the total key thus loses control of the upper counter connections but it may be depressed to release the racks in the familiar manner.

The same total key is thus used for taking a total on both the upper and lower counters. When a total is taken on the upper counter the key operates in the familiar manner. When a total is taken on the lower counter, the connection to the upper counter is disabled but the total key releases the racks, the lower counter having been positioned for total taking purposes by its separate control lever 104.

The same action occurs in taking a sub-total since the sub-total and the total keys in the Burroughs machine both act on the link 63 and both release the racks. In taking a sub-total on the lower counter in the present machine, depression of the sub-total key after the lower counter control lever 104 has been placed in sub-total position simply releases the racks without affecting the upper counter. This releasing action takes place when the total key is depressed and consequently a sub-total may be taken in the lower counter by the use of the control lever 104 and the total key.

The link 213 also has a projection 217 (Fig. 19) extending in front of the link 63 to move the link 63 back to its normal position when the control lever 104 is moved to central position.

INTERLOCKS

Numerous interlocks are provided for preventing misoperation of the machine, as follows:

(a) Subtraction lever and lower counter control lever

Means are provided for preventing operation of the subtraction lever 30 when the lower counter control lever 104 is moved from neutral position and also for preventing movement of the lower counter control lever 104 when the subtraction lever 30 is in certain positions. In changing the machine from addition to subtraction or vice versa preparatory to taking a total from the upper counter, it is necessary to give it two spacing strokes. The first stroke tumbles the upper counter and adds or subtracts the fugitive one and the second stroke restores all tripped transfer segments. It is not desirable to permit operation of the control lever 104 for the lower counter while these spacing strokes are being taken and hence means is provided which, after the subtraction lever 30 is moved, locks the lever 104 until after two spacing strokes have been taken. Also when the lever 104 is moved to total or subtotal position for the lower counter, it is not desirable that the position of the subtraction lever be changed and, accordingly, a locking means is provided for preventing movement of the lever 30 when the lever 104 is moved out of its neutral position.

Pivoted to the substraction lever at 220 is a Y-shaped member 221 the arms of which are hook shaped for receiving a stud 222 on a laterally projecting arm on the bell crank lever 211—212 which is rocked by movement of the lower counter control lever 104. Also pivoted on the pivot 220 of the subtraction lever is a second Y-shaped member 223 shown in dotted lines in Fig. 21 having a slot 224 operating over a stud 225 on an upward extension of the lever 35. The two Y-shaped members are connected together by a pin 226.

With the subtraction lever in "addition" position and with the control lever 104 in central position the parts occupy the position illustrated in Fig. 1. Either lever may be operated when the parts are in this position. When the subtraction lever is moved from the "addition" position of Fig. 1 to the "subtraction" position of Fig. 21 the bottoms of the Y-shaped members are carried forwardly while their top ends are held against forward movement by the stud 225. Accordingly the Y-shaped members are swung to the position of Fig. 21 with the notch in the Y-shaped member 221 hooked over the stud 222. This prevents movement of the lower counter control lever 104 in either direction since such movement would tend to rock the bell crank lever 211—212 about its pivot but such movement is prevented by the locking of the stud 222 in the notch of the Y-shaped member 221.

If the machine is then operated with the subtraction lever in "subtraction" position, the lever 35 is rocked clockwise which throws the stud 225 over into radial line with the subtraction lever 30 so that the Y-shaped members are again brought into a position with the left hand branch of Y-shaped member 221 near the stud 222 but not hooked over it. In this position, the control lever 104 may be shifted as far as the subtraction lever is concerned but, because of the construction of the machine, it is necessary to give the machine two spacing strokes before the control lever can actually be moved. One of these strokes tumbles the upper counter to subtraction position, restores the carry if there happens to be one and borrows the so-called "fugitive 1" from the upper counter as explained in Rinsche Patent No. 1,172,484, and the next spacing stroke restores the carry resulting from the automatic operation of the mechanism for taking care of the "fugitive 1" which mechanism operates when the counter is tumbled during the first spacing stroke. The interlock that requires the two spacing strokes includes the bail 230 (Figs. 19 and 20) which is automatically rocked rearwardly by the pawls 231 whenever a carry takes place. The end of this bail projects into a cam slot in one arm 232 of a yoke whose other arm 233 is adapted to be positioned in the path of a stud 234 on the link 213 which is reciprocated by the lower counter control lever 104. Whenever any of the pawls 231 have been tripped for a carry and the bail 230 moved rearwardly by a tripped pawl to the position of Figs. 19 and 20, the arm 233 is rocked down in front of the stud 234 and the control lever 104 cannot be moved until the machine has been given the necessary spacing strokes to restore the carry.

If the subtraction lever is moved back to "addition" position after a subtraction operation has been performed, the lower ends of the Y-shaped members are carried to the left while the upper ends are held against such movement by the stud 225 so that the Y-shaped members are again tilted as before but in the opposite direction and the opposite or left hand branch of the Y-shaped member 221 hooks over the stud 222 to prevent movement of the lower counter control lever 104. If the machine is then operated the upper end of lever 35 moves counter-clockwise thereby moving stud 225 into radial line with the lever 30 and releasing the interlock.

If the counter control lever 104 is moved either to its total or sub-total position while the parts are in the "addition" position illustrated in Fig. 1, the bell crank lever 211—212 is rocked counter-clockwise a short distance the movement being just enough to bring the broad end 227 of an arm 228 of the bell crank lever in front of a stud 229 on the subtraction lever 30 with the result that the subtraction lever cannot be moved (Fig. 15). The same action takes place when the lever 104 is moved when the subtraction lever is in "subtraction" position except that the end 227 of the lever then passes up on the rear side of the stud 229.

In this way the subtraction lever and the lower counter control lever are interlocked so that when one is operated the other cannot be.

Movement of the lower counter control lever 104 when the subtraction lever 30 is in any mid-position between its "addition" and "subtraction" positions is prevented by the square stud 229 which passes over the top of the end 227 of arm 228.

*(b) Subtraction lever and non-add key upper counter*

Means is also provided for preventing the upper counter non-add key 170 from being depressed when the subtraction lever 30 is in any mid-position.

The link 172 which is pivoted to the subtraction lever 30 has a projection 235 (Fig. 1) which passes under a stud 171 on the non-add key stem and to the front or rear of it whenever the subtraction lever is moved from "subtraction" to "addition" position or vice versa. When the lever is in any mid-position the projection 235 is under the stud 171 and depression of the non-add key is prevented. The link 172 also has a projection 237 that engages a shaft on the machine immediately adjacent to it to prevent the link from being moved downwardly when the non-add key is depressed with the stud 171 in engagement with the projection 235.

Likewise the subtraction lever is blocked when the non-add key is depressed. In such event the stud 171 passes down in front of the projection 235 (Fig. 17) thereby preventing forward movement of the link 172 and effectually blocking the subtraction lever.

*(c) Total key and lower counter control lever*

When the total key is depressed, the lower counter control lever 104 cannot be moved from whatever position it may be in. The link 213 connected to the bell crank 211—212 and operated by the control lever 104 has an upwardly extending projection 240 (Fig. 15) which passes on either side of a stud 241 on the total key bell crank lever 61 the position of the parts with the total key depressed and the control lever 104 is sub-total position being illustrated in Fig. 15. Obviously the control lever 104 cannot be moved while the parts are in this position, since movement of the lever tends to rock bell crank lever 211—212 clockwise to pull link 213 to the rear, but this link is blocked by the stud 241 in front of projection 240. The same holds true when the control lever 104 is in its total position in which case the projection 240 is in the same position relative to stud 241. When the control lever 104 is in central poistion, shown in Fig. 1, the stud 241 passes down in front of projection 240, thereby locking the lever 104 against movement.

In other words, the control lever 104 for the lower counter cannot be moved no matter what its position, when the total key is depressed. The same holds true for the sub-total key which moves the bell crank lever 61 with its stud 241 in the same manner as the total key.

*(d) Total key and non-add key upper counter*

When the total key is depressed the upper counter non-add key 170 cannot be depressed to non-add the upper counter. The total key bell crank lever is connected to a link 250 having a projection 251 (Fig. 15) which passes under a stud 252 on the non-add key stem to prevent such movement.

The same holds true for depression of the sub-total key which also moves the link 250 to the rear to move the projection 251 under stud 252.

If the non-add key is depressed before the total key is depressed, there is no interference by the projection 251 on link 250, but the total key is locked against depression by a spring held pawl 253 (Fig. 1) carried by the lever 174, said pawl passing in front of a stud 254 on the link 250. Depression of the non-add key carries lever 174 downward to move pawl 253 in front of stud 254 to block depression of the total key when the non-add key is depressed.

The sub-total key is locked against movement in the same way since it must move the link 250 in order to move to depressed position.

With the non-add key 170 for the upper counter depressed, it might be desired to take a total on the lower counter but as above pointed out depression of the upper counter non-add key locks the total key against depression. Accordingly provision is made to release the total key under these conditions if a total is desired on the lower counter.

For this purpose the bell crank latch 106 which is rocked when the lower counter control lever 104 is moved to total or sub-total position, is provided on its rearward arm with a curved extension 255 (Figs. 15 and 16) positioned to engage a stud 256 on one arm of the pivoted latch 253 so that when the control lever 104 is moved to either total or sub-total position the latch 253 is rocked up against the tension of its spring out of the path of the stud 254 on link 250 thereby permitting depression of the main total key as shown in Figs. 15 and 16.

(e) Subtraction lever and total key

The pin 241 on the total key bell crank lever also passes down in rear of a projection 260 (Fig. 21) on the subtraction lever 30 when the total key is depressed with the subtraction lever in "subtraction" position. The same pin passes in front of the projection 260 when the total key is depressed with the subtraction lever in "addition" position (Fig. 15). This prevents the subtraction lever being moved when the total key is depressed.

When the subtraction lever is moved to "subtraction" position, the total key cannot be depressed until the machine has been given the necessary spacing strokes to put it in subtraction condition. This is prevented by the engagement of a square stud 261 (Fig. 21) on the total key bell crank 61 with the end of one of the branches of the Y-shaped member 223. However after the machine has been given the necessary spacing stroke, this Y-shaped member moves to a position in radial alignment with subtraction lever 30 and the total key may be depressed. The same locking action takes place when the subtraction lever is moved from "subtraction" to "addition" position for taking a total with the machine in adding condition except that the other branch of the Y-shaped member 223 becomes active. Depression of the total key with the subtraction lever in any mid-position is prevented by the engagement of stud 241 with the top of extension 260.

CHARACTER PRINTING

The machine is arranged to automatically print special characters to indicate what operation has taken place and on which counter. The mechanism for printing such special characters is of the familiar type described in White Patent No. 1,018,285, February 20, 1912 to which reference is made for details. In the present machine one or two more steps are placed on the stepped segment used to determine the position of the character type bar and this segment is arranged to be controlled by the lower counter control lever 104 to position these extra steps in the proper position to designate operations on the lower counter.

The control lever 104 has a lateral rearwardly projecting arm 270 (Figs. 1 and 15) carrying a stud operating in a cam slot in a lever 271 pivoted at 272 and extending forwardly. The front end of this lever 271 is stepped and it is positioned to be engaged by a lug 273 on a projection on the link 250 which is thrust rearwardly when the total key 60 is depressed. When the control lever 104 is in sub-total position the upper stop on lever 271 is contacted by lug 273 as shown in Fig. 15. When the lever 104 is in total position the lower stop is contacted by the lug. The lever 271 is thus thrust rearwardly different distances when the total key 60 is depressed depending on the position of lever 104. The pivotal connection of the lever 271 at the rear is with an arm connected to the shaft that positions the segment for determining the position of the character type bar and in this way said segment is positioned when a total or sub-total is taken on the lower counter.

NEGATIVE TOTAL LOCK

Provision is made for locking the total key against depression when there is a negative total in the upper counter and the machine is conditioned for addition. The means for doing this also locks the total key against depression when there is a positive total in the upper counter and the machine is conditioned for subtraction. In other words, a total cannot be taken from the upper counter unless the machine is properly conditioned in a manner consistent with the total standing on the counter. The most frequent use for this safety mechanism is in preventing the taking of a total when there is a negative total on the upper counter and the machine is in condition for addition, for which reason the mechanism is referred to generally as a "negative total lock" but it will be understood that it also acts to prevent the taking of a total when the total is positive and the machine is in condition for subtraction.

The total key bell crank lever 61 is provided with a stud 280 (Figs. 23 and 24) positioned to engage the end of a locking arm 281 pivoted at 282, said arm having a forward extension 283 and being normally urged in a clockwise direction to "release" position by a spring 284. When the lever 281 is in the position illustrated in Fig. 23, the stud 280 may pass the end of the lever and the total key can be depressed, but when the arm 281 is in the position of Fig. 24 the stud contacts the end of the lever and depression of the total key is prevented. The negative total lock therefore concerns the positioning of the lever 281 under control of the upper counter and of the means for conditioning the machine for addition or subtraction. As previously explained, the bell crank 61 is moved downward by depression of the sub-total key as well as by the total key so when the bell crank is locked against movement neither key can be depressed.

The machine is conditioned for addition or subtraction by moving the lever 30 to proper position and operating the machine as heretofore described. When the control lever 30 is in the full line position shown in Figs. 23 and 24 the machine is conditioned for addition, but when the lever is in the dot and dash line position illustrated in Fig. 24 the machine is in condition for subtraction. After the lever is moved from one position to the other and the machine is given a stroke of movement the lever 35 is rocked (Fig. 1). When the machine is changed from addition to subtraction condition this lever 35 is rocked in a clockwise direction and when the machine is changed from subtraction to addition condition it is rocked in a counter-clockwise direction. In other words, during operation of the machine after a change in setting from addition to subtraction the upper end of the lever 35 moves forward as viewed in Fig. 23 and when the change is from subtraction to addition the upper end of the lever moves to the rear. The control of the negative total lock in response to the condition of the machine is controlled through movements of this lever as will be later described.

In a total taking operation, when changing the machine from addition to subtraction condition and vice versa, it is necessary, as previously explained, to give it two spacing strokes. On the first spacing stroke the carry pawls are restored to normal position and the mechanism is operated for automatically taking care of the "fugitive one". The latter action trips the carry pawls again and a second spacing stroke is necessary to restore them to normal condition.

During these spacing strokes in changing from addition to subtraction and vice versa the total and sub-total keys are locked against depression, in fact, these keys are locked whenever the carry pawls are not restored to normal. Connected with the bail 230 is a pivoted arm 245 whose end is swung under the stud 280 on the total key bell crank lever whenever the bail is moved rearwardly which it is by any one of the carry pawls when the latter is tripped to effect a carry. Arm 245 prevents depression of the total and sub-total keys until the pawls have been restored and the bail 230 returned to its normal position, which is accomplished by a spacing stroke. Rearward movement of the bail 230 by the tripping of a carry pawl also blocks the control lever 104 by moving the abutment 233 in front of the stud 234 on the link 213 which must move forward in order to permit movement of the control lever 104 for the lower counter. Accordingly, no total or sub-total can be taken on the lower counter when the carry pawls are not in normal position.

The control of the negative total lock by the upper counter is effected through the medium of cam teeth 285 and 286 on the respective left hand pinions of the two sets of pinions 20 and 21. These cam teeth operate pivoted pawls 287 and 288 respectively. Pawl 287 is pivoted at 289 to a supporting plate 290, the pawl being normally urged in a counter-clockwise direction by a spring 291 which holds the pawl in contact with a stationary cross shaft 292 thereby positioning the lateral foot 293 of the pawl in the path of the cam tooth 285 whenever the upper counter is in addition position, that is, when the pinions 20 are in mesh with the racks. When the counter is moved to subtraction position to move the pinions 20 out of mesh with the racks the path of the cam tooth 285 is beyond the pawl 287 so that the left hand pinion 20 no longer controls this pawl. The stationary shaft 292 also positions the supporting plate 290 which has a pair of jaws that embrace the shaft as illustrated in Fig. 23.

The pawl 288 is pivoted at 294 to the plate 290 and it is normally urged by the spring 295 in a counter-clockwise direction, its position being limited by the engagement of the top end of the pawl with a lug 296 on the plate 290. The lateral foot 297 of the pawl is thus normally positioned in the path of the cam tooth 286 on the left hand pinion 21 when the counter is in subtraction position, that is, when the pinions 21 are in mesh with the racks, but when the counter is in addition position as illustrated in Fig. 23, the path of the cam tooth 286 is outside of the foot 297 of the pawl 288 so that the left hand pinion 21 has no control of pawl 288 under these conditions.

The rear side of pawl 287 has a raised portion 298 positioned so as to engage a stud 299 on the arm 300 of a three armed lever pivoted at 301. The pawl 288 also has a raised portion 302 likewise positioned to engage the stud 299. A second arm 303 of the three armed lever extends downwardly and its lower end is apexed and positioned to engage a stud 304 on a pivoted positioning latch 305 normally urged counter clockwise by spring 306. This spring held latch tends to hold the three armed lever in either of the positions to which it may be moved, that is, it holds it in the position illustrated in Fig. 23 or in the opposite position shown in Fig. 24.

The third arm 307 of the three armed lever extends upwardly and is provided with a stud 308 operating in a slot 309 in a link 310. This slot has a central or flat portion 311 with upwardly extending end portions 312.

Figure 2:
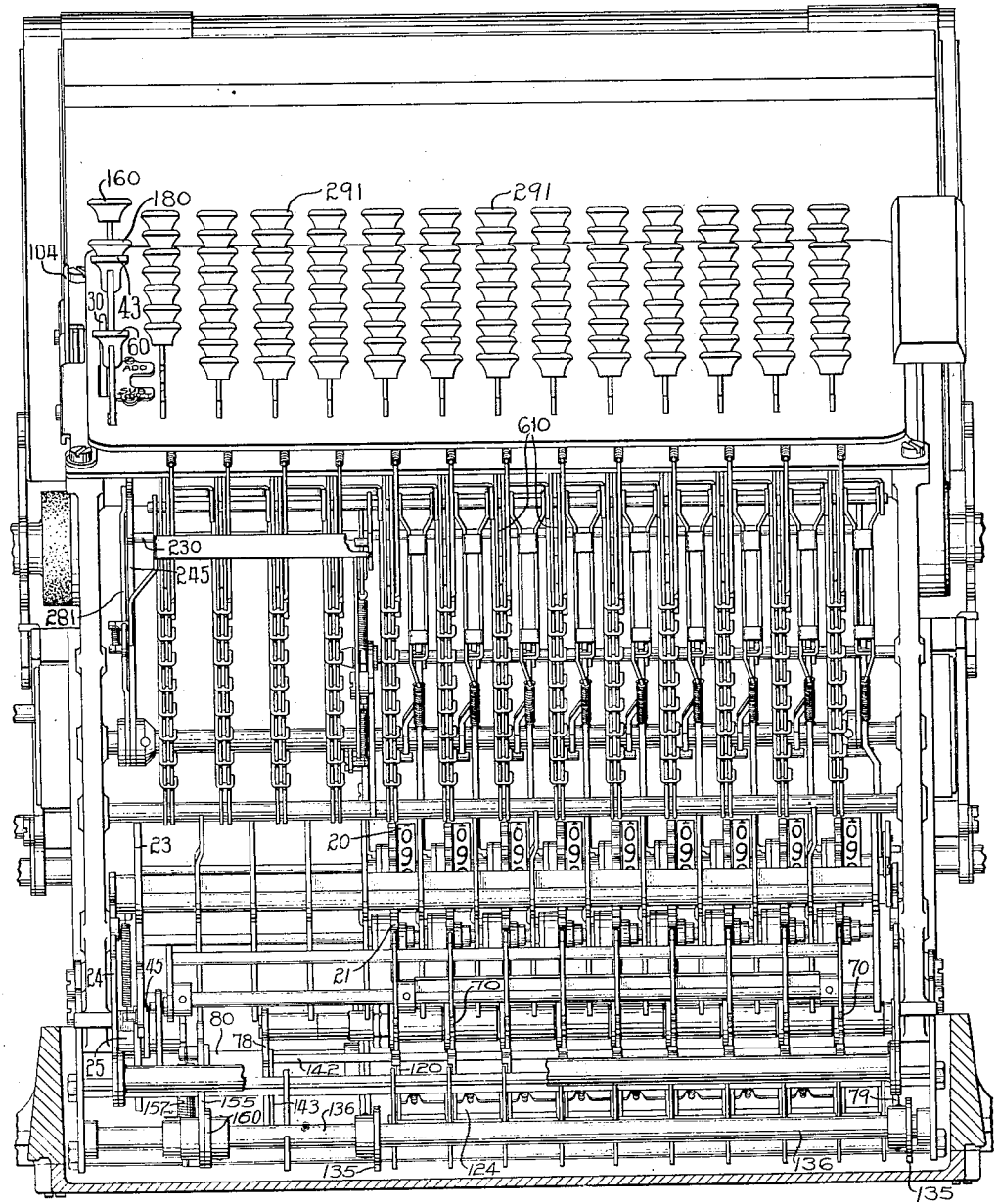
Fig. 2 is a front elevation of the machine with the casing removed.

It will be observed that the mechanism controlled by the counter is located at the left end of the numeral counter and at the right side of the date segments as illustrated in Fig. 2. The link 310 extends rearwardly and is connected at 313 to an arm 314 fixed to a shaft 315 that extends to the left hand side of the machine where there is connected to it a forked arm 316 straddling a stud 317 carried by the upper end of the lever 35 that is moved back and forth when the machine is changed from addition to subtraction and vice versa.

Pivoted on a shaft 320 at the upper forward part of the machine is a yoke-shaped member 321 having a rearwardly extending arm 322 at its right end and a downwardly and rearwardly extending arm 323 at its left end (Figs. 2 and 22). The rearwardly extending arm 322 carries a stud 324 contacting the upper side of the link 310 and the rearward extending arm 323 is connected by means of a spring 325 to the forward extending arm 283 of the locking arm 281. Movements of the yoke 321 are thus transmitted to the locking arm 281 through the spring 325.

The operation of the negative total lock is as follows:

Assume that the parts are in the condition shown in Fig. 23 and that there is a positive total on the upper counter pinions 20 with the control lever 30 in "addition" position. The locking lever 281 is then free of the stud 280 on the total key bell crank lever 61 so that either a total or a sub-total may be taken. If, with the parts in this position, the lever 30 is moved to subtraction position and a number or series of numbers is subtracted the negative total lock functions in the following manner:

When the lever 35 is rocked forward during the spacing stroke in the change from addition to subtraction it thrusts the link 310 forward and, since the stud 308 remains stationary the link is cammed counter-clockwise by the contact of its upper edge 311 of the slot 309 with the stud. The upper side of the link contacts the stud 324 and rocks the yoke 321 clockwise and with it the arm 281 which is moved to a position such that the end of the arm is under the stud 280 thereby preventing depression of the total key while the machine is in substraction condition with a positive total in the counter. In order to take a total the lever 30 must be moved back to addition position and the machine conditioned for addition whereupon the parts again occupy the position illustrated in Fig. 23 and the total may be taken and printed.

If, in the example cited above, it be assumed that the number or numbers subtracted from the counter are greater than the sum of those already in it, then the counter contains a negative total and the lock functions in the following manner:

Assume, as an example, that the total standing in the pinions 20 is the number 444 and that 666 is to be subtracted from it. When the pinions 20 are standing at 444 the pinions 21 register the complement less 1, that is 999555. In order to subtract 666 the machine must be conditioned for subtraction and when this is done a unit 1 is automatically added to the pinions 21 so that they register 999556 while the pinions 20 register 443. When 666 is subtracted the pinions 21 are rotated clockwise which rotates the pinions 20 counterclockwise. The number 666 is thus added to the amount 999556 on the pinions 21 and they pass through 999999 to −222. When they pass through the 999999 position, the left hand pinion passes from 9 to 0 whereupon the cam tooth 286 cams the foot 297 of pawl 288 rearwardly thereby rocking the pawl in a clockwise direction to cause its upper end to contact the stud 299 on the arm 300 and rock the three armed lever counter-clockwise to the position illustrated in Fig. 24 where it is held by the latch 305. In order to subtract 666 the subtraction lever 30 had to be moved to the dot and dash position shown in Fig. 24 and this resulted in the thrusting forward of link 310 as previously explained so that, prior to any movement of the pawl 288, the link 310 had been moved forward and the stud 308 occupied a position at about the center of the flat portion 311 of the slot 309. This movement of the link 310 locked the total key against depression as previously explained but when the counter changed from a positive to a negative total thereby moving the pawl 288 rearwardly, the stud 308 moved further to the rear and to a position where it permitted the link 310 to be drawn downwardly by the spring 291 thereby releasing the arm 281 which is drawn forward by the spring 284 to release the total key. Accordingly, when the counter contains a negative total and the machine is in condition for subtraction, the total key may be depressed.

If, however, while there is a negative total in the counter, the lever 30 is moved to "addition" position, and the machine conditioned for addition, the total key is locked against depression. The change from subtraction to addition causes the link 310 to be drawn rearwardly again. At the time this occurs the stud 308 occupies the left upward extension 312 (Fig. 23) of the slot 309 and the rearward movement of the link causes it to move on the stud 308. The central portion 311 cams the link upwardly and rocks the yoke 321 clockwise to move the arm 281 to locking position as previously described. Accordingly, while there is a negative total in the counter the total key is locked against operation when the machine is conditioned for addition.

If, while there is a negative total in the counter the machine is changed from subtraction to addition and an item or items added after which the machine is again conditioned for subtraction, but at which time the total in the counter is positive the total key is locked against depression. With a negative total in the counter the stud 308 occupies the position illustrated in Fig. 24, but when the counter passes from a negative to a positive total the stud moves back to the position of Fig. 23. Assume that there is a negative total of −222 in the counter 21 and that 999 is added to it. At the time the pinions 21 register −222 pinions 20 register 999777. When the machine is changed from subtraction to addition in order to add 999 the automatic operation of the counter to take care of the "fugitive one" changes the amount in the pinions 21 to −221 and the amount in pinions 20 to 999778. As 999 is added to the pinions 20 they pass through their 999999 position to +777 and during this movement the left hand pinion 20 moves in a clockwise direction from 9 to 0. During this movement of the left hand pinion its cam tooth 285 contacts the foot 295 of the pawl 287 thereby rocking the pawl clockwise and moving the stud 299 rearwardly which rocks the arm 307 clockwise to move the stud 308 to the position of Fig. 23. As long as the machine remains in condition for addition a total may be taken but, if the lever 30 is moved back to subtraction position and the machine is conditioned for subtraction the link 310 is thrust forwardly and the stud 308 cams it upwardly to rock the yoke 321 to move the arm 281 to locking position.

The above locking actions take place even though the counter does not contain any items when the machine is changed from addition to subtraction. It will be understood that when the pinions 20 are at zero the pinions 21 register 999999 for a six bank machine. If the machine is changed from addition to subtraction under these conditions a "fugitive 1" is added to the pinions 21 which changes them from 999999 to 000000 and the pinions 20 move from 000000 to 999999. During this movement the left pinion 21 moves from 9 to 0 and operates the lock as heretofore described. If the machine is changed back from subtraction to addition the "fugitive 1" is automatically subtracted from the pinions 21 and added to the pinions 20. This moves the pinions 21 to 999999 and the pinions 20 from 999999 to 000000. During this movement, the left hand pinion 20 moves from its 9 to its 0 position, and operates the lock as described.

A locking mechanism is thus provided which prevents an operator from taking a total on the upper counter except when the machine is properly conditioned consistent with the total on the upper counter. An operator may be required to enter a long list of items in the machine some of which are to be added and others of which are to be subtracted. He may not know whether he has a negative or positive total. If he assumes that he has a positive total when in fact he has a negative he is notified at once by the fact that he cannot take a total with the machine in "addition" condition. He must condition it for subtraction in which event he can get the true negative total or overdraft. Likewise if he has a positive total when he thinks he has a negative total this fact is indicated to him by the fact that the total key lever is blocked against operation while the machine is in condition for subtraction thereby requiring that he condition it for addition before he can take a total.

RELEASE OF NEGATIVE TOTAL LOCK BY LOWER COUNTER CONTROL

It is often desirable to take a total on the lower counter even though the upper counter may be locked against total taking. To do this, the total key must be depressed and hence some means must be provided for releasing the negative total lock when a total from the lower counter is desired. For this purpose the lateral projection 214 on the link 213 which is thrust forward by movement of the lower counter control lever 104 when the latter is moved to total or sub-total position, is extended over behind the negative total locking arm 281 so that, when the lever 104 is moved to total or sub-total position and the link 213 thrust forward, the member 281 is automatically moved forward to permit depression of a total key. This movement of arm 281 may take place even though the yoke 321 may be moved to a position to move the arm 281 to locking position, because the connection between the yoke and arm 281 is yielding, that is, the arm 281 may be moved relative to yoke 321 against the tension of spring 325. This release of the total key does not permit the taking of a total on the upper counter because the same forward movement of the link 213 that releases the total key disables it from controlling the upper counter control link 63 as hereinbefore described.

A total may thus be taken on the lower counter at any time irrespective of whether the total key is blocked against the taking of a total on the upper counter or not.

OPERATION

As previously stated the machine may be conditioned to automatically perform different operations in varying sequence. The operator sets up the items in the machine, presses the motor touch bar, and the machine performs automatically. The following description of some of the many operations will be made without particular reference to the automatic operation, it being understood that in most cases the machine operates automatically, but may be operated by hand if desired.

NORMAL OPERATION—ADDITION BOTH COUNTERS

Normally the upper counter is in engagement with the racks in its addition position and the lower counter is disengaged from the racks as illustrated in Fig. 1. Assume that the machine remains in condition for simple addition, that an amount is set up in it, and that a forward stroke is started. At the beginning of the forward stroke, the upper counter is rocked out of engagement with the racks which thereupon descend to positions determined by the stops set by the amount keys. At the end of the forward stroke both the upper and the lower counters are rocked into engagement with the racks and upon the return stroke the racks ascend and transfer the amount set up to both counters. At the end of the return stroke the lower counter is rocked out of engagement with the racks, but the upper counter remains in engagement with them as illustrated in Fig. 1. Addition thus takes place on both the upper and the lower counter simultaneously.

Simple addition on either counter may, of course, take place independently of the other counter by simply enabling the non-add mechanism for the other counter either by the depression of the appropriate non-add key or automatically by means of rollers on the carriage.

This capacity to add simultaneously on both counters or selectively on either counter adapts the machine for a variety of uses in which certain items may be added on both counters, others added on the upper counter only, and still others on the lower counter only, the variation being in the sequence desired.

*Normal total or sub-total*

If a number of items have been set up in the machine and it has been operated normally—that is, the items have been added simultaneously in both counters and if the total key is depressed and the machine operated to take a total, the total is taken from the upper counter and added to the lower counter, the operation being as follows:

When the total key is depressed it disables the connection for rocking the upper counter out of engagement with the racks at the beginning of the forward stroke. Accordingly the racks descend while in engagement with the upper counter and their positions are determined by the amount in the upper counter which is rotated to zero by the descent of the racks. This depression of the total key does not change the controls for the lower counter which remains out of engagement with the racks until near the end of the forward stroke when it is rocked into engagement with them since its controls are in their normal position for addition. At the beginning of the return stroke the upper counter is rocked out of engagement with the racks by the pitman 914 in a manner hereinbefore described, but the lower counter remains in engagement with the racks until near the end of the return stroke when it is rocked out of engagement with them to its normal position, but during the return of the racks to their normal position, the amount has been added in the lower counter. At the end of a return stroke when a total has been taken in this manner, the upper counter is out of engagement with the racks.

If a sub-total is taken under the above conditions, the sub-total is added to the lower counter in the same manner, the only difference in operation being that, in the taking of a sub-total, the upper counter is not moved out of engagement with the racks at the beginning of the return stroke because the pass-by pawl 821 is disabled by depression of the sub-total key. At the end of a sub-totaling operation the counters stand in their normal position, illustrated in Fig. 1, the total remaining on the upper counter and having been transferred additively to the lower counter.

In this way totals may be taken on the upper counter, the upper counter cleared and during the operation the total is transferred to the lower counter where it may be stored for future use. By placing the lower counter in non-add condition during the adding of items on the upper counter and then enabling the lower counter during the taking of a total, the lower counter may be used to simply store the totals taken from time to time on the upper counter. In other words, the lower counter may show the grand total of all operations while the upper counter is used to total or sub-total different individual accounts or groups of figures. If the lower counter is not placed in non-add position during the listing of items, the total on said counter after the taking of a total on the upper counter is twice the total on the upper counter. Under some conditions it is desirable to operate the machine in the latter manner.

*Total or sub-total on lower counter*

If a total or sub-total is to be taken on the lower counter the control lever 104 is thrown either forward or backward to condition the lower counter control for this purpose. Such movement of the lever disables the connections of the total and the sub-total keys for controlling the upper counter for totaling purposes. Let it be assumed that a number of items have been listed in the normal way—that is, added on both counters and that the control lever 104 is moved to total position and the total key 60 depressed. At the beginning of the forward stroke the upper counter is rocked out of engagement with the racks in the same manner as for normal addition, but the lower counter is rocked into engagement with the racks since the control for this counter has been moved so that the proper cam surfaces act to move the lower counter into engagement with the racks. Depression of the total key releases the racks which descend to positions determined by the amount in the lower counter. At the end of the forward stroke the upper counter is rocked into engagement with the racks the same as in normal addition. At the beginning of the return stroke, the lower counter is rocked out of engagement with the racks which are thereupon returned to normal position while the upper counter is in engegement with them and the total is added to the upper counter, the lower counter having been cleared.

When a sub-total is to be taken on the lower counter the action is, in general, the same except that the control lever 104 is moved to the rear to sub-total position which renders the sub-total cam for the lower counter active to engage the lower counter with the racks prior to their descent, but instead of disengaging it at the beginning of the return stroke it is allowed to remain in engagement with the racks during their return to normal position. The sub-total is transferred additively to the upper counter the same as when a total is taken and the transferred amount remains on the lower counter.

By placing the upper counter in non-add condition during the listing of items on the lower counter, and subsequently enabling of the upper counter at the time a total is taken from the lower counter, the upper counter may be used to store the totals or sub-totals taken in the lower counter.

It will be appreciated that with the machine capable of simultaneous addition on both counters, selective addition on either counter, selective totaling or sub-totaling on either counter with automatic transfer of the amount to the other counter that a wide variety of operations may be performed in different sequences that are determined by the carriage and its automatic control which are adjusted to suit the requirements of the particular accounting or statistical system with which the machine is being used.

*Subtraction*

When subtraction is to be performed with the machine otherwise in normal condition, the subtraction lever 30 is pulled forward to subtraction position and items entered and listed in the usual manner. At the beginning of the forward stroke of the machine the upper counter is rocked out of engagement with the rack and the cradle is tumbled so that the lower set of pinions of the upper counter is positioned to be engaged with the racks when the counter is moved to active position. The upper and lower counters are then moved into and out of engagement the same as when the machine is performing addition, for example, the upper counter remains out of engagement with the racks until near the end of the forward stroke when it is rocked into engagement with them but the lower set of pinions engages the rack instead of the upper. Also at the end of the forward stroke the lower counter is moved into engagement with the racks. As the racks are returned to normal position the amount that has been set up is added in the lower counter and simultaneously subtracted in the upper counter. At the end of the return stroke the lower counter is moved out of engagement with the racks but the upper counter remains in engagement with them. In other words, under normal conditions, when the machine is positioned for subtraction, it simultaneously subtracts on the upper counter and adds on the lower counter. In this manner items such as checks to be subtracted from an old balance may be subtracted from the old balance in the upper counter and at the same time added in the lower counter.

If it is desired to perform subtraction only, the lower counter may be placed in non-add condition in which event the upper counter acts as a subtractor only. Accordingly, during operations in which items are being subtracted from the upper counter and simultaneously added in the lower counter, certain of the items may be subtracted from the upper counter without being added in the lower counter by non-adding the lower counter and likewise certain items may be added in the lower counter without being subtracted in the upper counter by non-adding the upper counter.

*Negative total or sub-total*

When the items subtracted from the upper counter produce a negative total or overdraft therein, such overdraft may be printed as such by depression of the total key 60 and operation of the machine in the usual manner for taking a total.

When the total key is depressed with the machine in subtraction condition and with an overdraft therein, the upper and lower counters are moved into and out of engagement with the racks in the same manner as taking a total when addition is performed, for example, depression of the total key disables the connections for causing the forward stroke of the machine to rock the upper counter out of engagement with the racks at the beginning of the forward stroke. Depression of this key does not change the timing or action of the lower counter and accordingly, on the forward stroke of the machine the lower set of pinions of the upper counter is allowed to remain in engagement with the racks while the lower counter is disengaged with the result that the extent of movement of the racks is determined by the negative total in the upper counter. At the end of the forward stroke the lower counter is rocked into engagement with the racks as when addition is performed. At the beginning of the return stroke, the upper or subtraction counter is moved out of engagement with the racks while the lower counter remains in engagement with them with the result that as the racks ascend the negative total is transferred additively to the lower counter.

Since the items listed in the subtraction counter were simultaneously added on the lower counter during the listing operation the total on the lower counter will be the sum of the items listed, plus the negative total on the upper counter.

If the lower counter is placed in non-add condition during the addition and subtraction of items from the upper counter and then enabled at the time a negative total or overdraft is taken from the upper counter the overdraft is simultaneously added into the lower counter and the lower counter may thus be used to store the negative totals taken on the upper counter.

Sub-totals may be taken in the same manner and similarly transferred to the lower counter, the operation of the machine being in general the same except that the upper counter is not rocked out of engagement with the racks at the beginning of their return, owing to the fact that the depression of the sub-total key disenables the pass-by pawl 821.

*Subtraction of total on lower counter from upper counter*

A total or sub-total may be taken on the lower counter and simultaneously subtracted from the upper counter whether the amount in that counter is positive or negative.

Assume that the machine is in subtraction condition, that the control lever 104 for the lower counter is moved forward to total position, that the total key 60 is then depressed, and the machine operated for taking a total. The lower counter is rocked into engagement with the racks at the beginning of the forward stroke and the upper counter is rocked out of engagement with them since the total key does not affect the upper counter control and the upper counter is moved the same as in performing direct subtraction. The racks are released and they descend to positions determined by the amount in the lower counter which is rotated to zero. At the beginning of the return stroke the lower counter is rocked out of engagement with the racks but the upper counter which was rocked into engagement with the racks at the end of the forward stroke, remains in engagement with them in subtraction position through the ascent of the racks with the result that the total on the lower counter in subtracted from the upper counter as the racks are returned to their normal position.

A sub-total may likewise be subtracted from the upper counter by moving the lower counter control lever 104 to the rear to sub-total position in which event the lower counter is not rocked out of engagement with the racks at the beginning of their return movement, but is allowed to remain in active position so that the total that is printed remains in the lower counter and is simultaneously subtracted from the upper counter.

Referring to the machine in general, it will thus be seen that it will add in the upper counter only, add in the lower counter only, simultaneously add in both counters, subtract in the upper counter only, subtract in the upper counter and simultaneously add in the lower counter, total or sub-total in the upper counter only, total or sub-total in the lower counter only, total or sub-total in the upper counter and simultaneously add the total or sub-total in the lower counter, total or sub-total in the lower counter and simultaneously add the total or sub-total in the upper counter, total or sub-total in the lower counter and simultaneously subtract the total or sub-total from the upper counter and print a true negative total from the upper counter regardless of whether that total has been created by subtracting items listed from the amount in the upper counter or by subtracting the total transferred from the lower counter. The machine may also be used for simply listing items by placing both counters in non-add condition.

Inasmuch as the sequence of the above operations may be varied indefinitely, an almost unlimited variety of operations may be performed. Not only is the machine capable of a large number of different separate functions but the grouping of these functions may be varied by varying the sequence in which the controls are manipulated, all of which may be done automatically without requiring attention on the part of the operator.

EXAMPLES OF WORK

Referring to the first example of bank work mentioned, if an operator desires to post his books for a customer's account he places a loose leaf ledger sheet in the machine and enters the old balance in the upper counter with the lower counter in non-add condition, the old balance being thus printed in any column desired in the bookkeeping system used. The machine then tabulates to the column or columns for checks where he enters the checks while the machine is in subtraction condition, in which it is placed automatically. The checks are subtracted from the old balance in the upper counter and automatically accumulated on the lower counter. The machine then tabulates from the check position to the position or positions for deposits where the new deposits are entered, such being added on the upper counter, but the lower counter is automatically placed in non-add condition. The machine is then tabulated to the column for a new balance where a total is taken from the upper counter (the lower counter being non-added), such total showing the new balance after the checks have been subtracted and the deposits added. If there has been an overdraft this will be quickly apparent because, when the operator attempts to take a total from the upper counter with the machine in addition condition, he cannot do so if there is a negative total. Accordingly, he must shift the machine to subtraction position and take the total which will show as a true negative total or overdraft. He can then take a total from the lower counter with the upper counter in non-add position which total will show the sum of the checks that have been subtracted from the account with which he can check against the pre-list that has been furnished him.

The machine may also be used to obtain the sum of the new balances. For example, a tally sheet may be used at the left on a split platen, as illustrated in Fig. 25. The machine can be arranged to automatically tabulate to this tally sheet and the net balances may be entered on this sheet and accumulated in the lower counter, such counter being in non-add condition during all other positions of the carriage. Accordingly, the new balances will be accumulated in the lower counter and when their total is desired, a total is taken from the lower counter, thereby showing the total new balances as of the posting date.

In addition to the examples of banking work the machine may be used for a wide variety of commercial purposes. One example of listing sales is illustrated in Fig. 25. In this example, a split platen is used having wide portion 330 and a narrow portion 331 about which a tally or sheet is fed. The two sections of the platen operate independently, that is, one of them may be line spaced independently of the other. In the example shown, the items sold for Cash are entered on the tally strip at the left, such items being added in the upper counter while the lower counter is in non-add condition. A sub-total is taken of these items with the lower counter still in non-add condition. The machine is then tabulated and the date entered after which it is again tabulated and the sub-total is printed as a total, but the lower counter is not in non-add condition in this column, hence the total will be transferred to the lower counter. The carriage is then tabulated back to the tally strip and another series of items is entered, the items in this case being Charge items. A sub-total is taken of these as the machine is tabulated to the column for Charge items where the sub-total is entered as a total and the upper counter cleared during which time the total is transferred to the lower counter and added to the first total. The machine is again tabulated to the tally strip and a third series of C. O. D. items is listed and a sub-total taken. The machine is then tabulated to the C. O. D. column and the sub-total is entered as a total in the C. O. D. column during which operation the upper counter is cleared and the amount transferred to the lower counter. The machine is again tabulated to the tally strip and a series of Returned items are listed with the upper counter in subtraction condition, as these items are to be taken from the total sales. A sub-total of the returned items is taken and the machine tabulated to the Return column where the sub-total is entered as a total with the lower counter in non-add condition. During the latter operation the upper counter is cleared but no action takes place on the lower counter. The machine is then tabulated to the column for Gross sales where a total is taken from the lower counter, the total being the sum of the totals in the first three columns. During the taking of this total it is automatically added to the upper counter which has a negative amount of $20.00 in it. The machine is then tabulated to the column for Net sales where a total is taken from the upper counter with the lower counter in non-add condition which gives a result of $40.00, such sum being the net sales, that is, the sum of the first three columns less the amount of the fourth.

This is only one simple example of the many and varied commercial operations that may be performed on the machine. The number of applications is almost unlimited but since the mechanical operation of the machine has been clearly described it is not considered necessary to further elaborate with examples of work that can be performed.

It is to be understood that the construction shown is for purposes of illustration only and that variations may be made in it without departing from the spirit and scope of the invention as defined by the appended claims.

I claim:

1. The combination in a calculating machine of a plurality of reciprocatory racks, two independent counters engageable and disengageable with said racks, total taking means controlled by a manipulative member for normally taking a total from one counter, and controlling means settable to a sub-total position for enabling a sub-total to be taken from the other counter by the manipulation of said manipulative member.

2. The combination in a calculating machine of a series of reciprocatory actuator racks, two independent counters engageable with and disengageable from said racks, a total key with connections for conditioning the machine for taking a total from one of said counters, a controlling means for regulating said second counter to take a sub-total, and connections between said controlling means and said total key for disabling the control of the first counter by the total key whereby when said key is depressed with the controlling means in sub-total position a sub-total will be taken from the second counter.

3. The combination in a calculating machine of a series of actuator racks, a counter engageable and disengageable with said racks for performing both addition and subtraction, total taking means for taking both a positive and a negative total from said counter, a negative total lock for preventing the taking of a total under predetermined conditions, a second counter, and means for taking a total from said second counter including connections for releasing said negative total lock.

4. The combination in a calculating machine of a series of actuator racks, a counter engageable and disengageable with said racks for performing both addition and subtraction, total taking means for taking both a positive and a negative total from said counter, a negative total lock for preventing the taking of a total under predetermined conditions, a second counter, and means for taking a sub-total from said second counter including connections for releasing said negative total lock.

5. The combination in a calculating machine of a series of actuator racks, a counter engageable and disengageable with said racks for performing both addition and subtraction, total taking means including a manipulative member for releasing said racks and taking both a positive and a negative total from said counter, a negative total lock for preventing manipulation of said member under predetermined conditions, a second counter, and means for regulating said second counter to take a total therefrom including connections for releasing said negative total lock to permit manipulation of said manipulative member, said connections also serving to disable the control of the first counter by said manipulative member.

6. The combination in a calculating machine of a rocking counter frame carrying pass-by pawls, a cam for engaging said pawls, means for moving one of said pawls out of engagement of the path of the cam, said means including an arm adapted to be positioned in the path of a stud on an oscillating member of the machine but normally urged out of its path, and positioning means for positioning said member in the path of said stud, said positioning means being movable in one direction to move the member in the path of the stud, to another position in the same direction to maintain the member in the path of the stud and to a third position in the same direction to permit said member to move out of the path of said stud.

7. The combination in a calculating machine having a series of actuator racks, two independent counters movable into and out of engagement with said racks, and an actuating means for each counter for moving it into and out of engagement with said racks; of a total-taking means for conditioning the actuating means of one of said counters for taking a total including connections for releasing the racks, a total-taking means for the second counter for conditioning its actuating means for the taking of a total on the second counter, and connections operated by the second total-taking means for causing its operation to disable the control of the actuating means of the first counter by the first total-taking means without disabling connections of the first total taking means for releasing the racks, whereby when the second totaling means is positioned for taking a total, said total may be taken by manipulating the first total-taking means and operating the machine while leaving the actuating means for the first counter in condition to cause addition to take place on said counter.

8. The combination in a calculating machine having a plurality of actuator racks, two independent counters engageable and disengageable with said racks, and an actuating means for each counter for moving it into and out of engagement with said racks; of a total-taking means for controlling the actuating means of one counter for taking a total including connections for releasing the racks, a sub-total taking mechanism for controling the actuating means of the second counter in the taking of a sub-total, and connections operated by the sub-total mechanism when moved to sub-total position for disabling the control of the actuating means for the first counter by the total taking means without disturbing the connections for releasing the racks whereby said sub-total may be taken on the second counter, by manipulating the first total means and operating the machine.

9. The combination in a calculating machine having a plurality of actuator racks, two independent counters engageable and disengageable with said racks, and an actuating means for each counter for moving it into and out of engagement with the racks; of a depressible total key for one counter having connections for releasing the racks and connections for conditioning the actuating means for said counter for taking a total, and a total-taking means for conditioning the actuating means for the second counter, said second total-taking means having connections for disabling the connections between the depressible total-key and the actuating means of the first counter.

10. The combination in a calculating machine of actuator racks, two counters movable into and out of engagement with said racks, operating mechanism for so moving the counters, control connections for varying the timing of the operating mechanism and a single means for selectively acting on said control connections to place either or both of said counters in non-add condition.

11. In combination, in a calculating machine having a series of actuator racks and a laterally shiftable paper carriage; two independent counters, a means for each counter for moving it into and out of engagement with said racks, a non-add mechanism for each counter moving means, and a single means operated by said paper carriage for controlling both of said non-add mechanisms.

12. The combination in a calculating machine having actuator racks, a counter, and moving means for moving the counter into and out of engagement with the racks; of a non-add mechanism for disabling said moving means, said non-add mechanism including a member movable into the path of a moving part of the machine but normally held out of said path, and a controlling member movable to successive positions in the same direction for moving said movable member into active position and to permit it to return to inactive position.

13. The combination in a calculating machine having actuator racks, two independent counters movable into and out of engagement with said racks, and a moving means for each counter; of a single control member having connections for controlling both of said moving means, said controlling member having four positions, in one of which said actuating means are conditioned to cause addition to take place in both counters, in another of which said actuating means are conditioned to non-add one counter while addition is performed on the other, in another of which both of said counters are non-added, and in another of which the second counter is non-added while the first is placed in addition condition.

14. The combination in a calculating machine having actuator racks, two independent counters, means for conditioning one of said counters to perform subtraction, and moving means for each counter; of a single controlling means for conditioning both of said moving means, said controlling means being movable to four positions, in one of which said moving means are conditioned to cause subtraction to be performed on one counter while addition is performed on the other, in another of which the subtraction counter is non-added while the other counter performs addition, in another of which both counters are non-added, and in another of which subtraction is performed on the subtraction counter while the other counter is non-added.

15. The combination in a calculating machine having actuator racks, two independent counters movable into and out of engagement with said racks, and a moving means for each counter for moving it into and out of engagement with the racks; of total-taking means including a total key which is operated in the taking of a total from either of said counters, a controlling means settable to total and sub-total positions for controlling the taking of a total and sub-total on one counter under the control of said total key, a non-add mechanism for the other counter, means for preventing operation of said total key when said non-add mechanism is operated, and means operated by said controlling member for releasing said total key when the controlling member is moved to total or sub-total position.

16. The combination in a calculating machine having actuator racks, a counter adapted to be conditioned for addition and subtraction, and a controlling means settable to different positions to condition the machine so that operation of said machine will condition the counter for addition and for subtraction; of a second counter, a controlling means for the second counter, and connections for preventing movement of the second controlling means after the first controlling means has moved until after the machine has been operated to change the condition of the first counter to correspond to the setting of the first controlling means.

17. The combination in a calculating machine having actuator racks, a counter movable into and out of engagement with said racks and adapted to be conditioned to perform addition and subtraction, and a subtraction lever movable to different positions to condition the machine so that upon two strokes of operation the counter is changed from addition to subtraction condition or vice versa; of a second counter, a controlling means for conditioning the second counter for taking a total or sub-total, and means for preventing operation of the second counter controlling means after changing the position of the subtraction lever until after the machine has been given two strokes of movement.

18. The combination in a calculating machine of a plurality of reciprocatory actuator racks, a counter carried by a movable frame that may be rocked to move the counter into and out of engagement with the racks, and a comb plate carried by said frame having stops for engaging projections on said racks for preventing overthrow of the same, said comb plate being movable out of the path of said projections as said counter frame is moved to move the counter out of engagement with the racks.

19. In combination, in a calculating machine having actuator racks, a counter carried by a rockable frame, an oscillatable cam directly engaging a member on said frame for rocking the counter into and out of engagement with the racks, and means for changing the position of said member to vary the action of the cam in rocking the counter into and out of engagement with the racks.

20. In combination, in a calculating machine having actuator racks, a counter carried by a rockable frame, an oscillatable cam having cam surfaces in different planes, a member carried by said rocking frame and slidable relative thereto, pass-by pawls carried by said member in position to be engaged by said cam, and means for moving said slidable member to different positions on said frame to position said pass-by pawls in the path of different cam surfaces on said cam to vary the action of said cam in rocking the counter into and out of engagement with the actuator racks.

In testimony whereof, I have subscribed my name.

WALTER J. PASINSKI.